United States Patent
Kee et al.

(10) Patent No.: US 10,241,764 B2
(45) Date of Patent: *Mar. 26, 2019

(54) AUTOMATICALLY TRANSFORM PASS-BY-VALUE SEMANTICS INTO PASS-BY-REFERENCE IMPLEMENTATION

(71) Applicant: NATIONAL INSTRUMENTS CORPORATION, Austin, TX (US)

(72) Inventors: Hojin Kee, Austin, TX (US); David C. Uliana, Austin, TX (US); Tai A. Ly, Austin, TX (US); Adam T. Arnesen, Pflugerville, TX (US)

(73) Assignee: National Instruments Corporation, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/588,298

(22) Filed: May 5, 2017

(65) Prior Publication Data

US 2018/0321925 A1 Nov. 8, 2018

(51) Int. Cl.
 *G06F 9/44* (2018.01)
 *G06F 8/41* (2018.01)
 *G05B 15/02* (2006.01)

(52) U.S. Cl.
 CPC .............. *G06F 8/436* (2013.01); *G06F 8/433* (2013.01); *G05B 15/02* (2013.01)

(58) Field of Classification Search
 CPC .......... G06F 8/433; G06F 8/436; G05B 15/02
 USPC ................ 717/140–144, 151–157, 159–161
 See application file for complete search history.

(56) References Cited

U.S. PATENT DOCUMENTS

| | | | |
|---|---|---|---|
| 6,546,433 B1 | 4/2003 | Matheson | |
| 6,901,588 B1 | 5/2005 | Krapf | |
| 7,458,071 B2 | 11/2008 | Asao | |
| 7,818,716 B2* | 10/2010 | Kodosky | G06F 8/34 715/762 |

(Continued)

OTHER PUBLICATIONS

Lee et al., "Memory-Mapping Support for Reducer Hyperobjects", Jun. 2012, ACM, 11 pages.*

(Continued)

*Primary Examiner* — Ted T. Vo
(74) *Attorney, Agent, or Firm* — Meyertons Hood Kivlin Kowert and Goetzel PC; Jeffrey C. Hood; Luke S. Langsjoen

(57) ABSTRACT

System and method for compiling a program, including determining one or more program structures containing one or more variables at the entry and exit of each program structure, wherein each variable specifies a value transfer operation of one or more source variables to a destination variable between outside the program structure and inside the program structure. A subset of the destination variables may be determined for which assigning the destination variable to a memory resource of a corresponding source variable does not disrupt the functionality of the program. Implementation of the value transfer operations may be executable to map each of the determined subset of destination variables to a respective memory resource. The mapping may be dynamically changed, thereby transferring the value from the first source variable to the destination variable without copying the value between the memory resources.

20 Claims, 22 Drawing Sheets

(56) References Cited

U.S. PATENT DOCUMENTS

| | | | |
|---|---|---|---|
| 9,311,111 B2* | 4/2016 | Foti | G06F 8/315 |
| 9,733,911 B2* | 8/2017 | Kee | G06F 8/443 |
| 9,753,697 B2* | 9/2017 | Proctor | G06F 8/31 |
| 2001/0052113 A1* | 12/2001 | Hearne | G06F 8/10 |
| | | | 717/106 |
| 2008/0280866 A1 | 11/2008 | Hauser | |

OTHER PUBLICATIONS

Line et al., "Lazy Object Passing in Java RMI", Sep. 2008, ACM, 10 pages.*

* cited by examiner

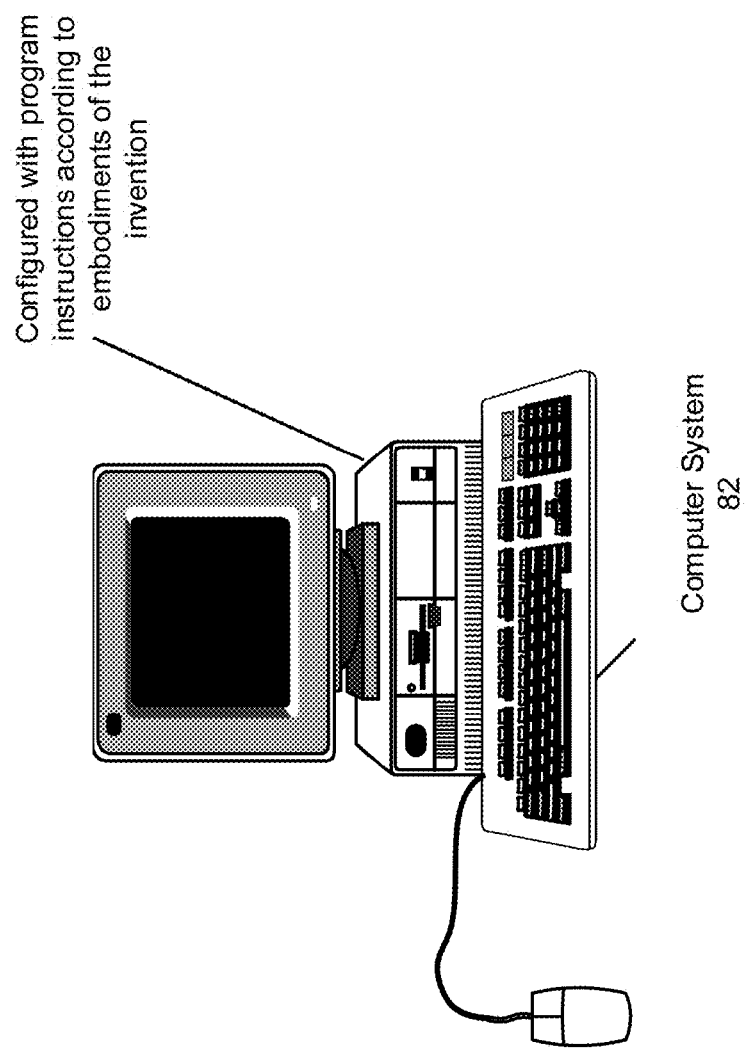

AUTOMATICALLY TRANSFORM PASS-BY-VALUE SEMANTICS INTO PASS-BY-REFERENCE IMPLEMENTATION

FIELD OF THE INVENTION

The present invention relates to the field of computer programming, and more particularly to automatically transforming variables with 'pass by value' semantics variables into 'pass by reference' implementation for execution or for configuration on a programmable hardware device.

DESCRIPTION OF THE RELATED ART

In compiling a program, a program variable is implemented on or in a memory resource, which stores the values of the program variable at run time. When the program needs to assign the values of one variable to another variable, and if the two variables are implemented on two different memory resources (often referred to as "pass by value"), then the assignment operation may take time to execute (e.g., to copy the value from one memory resource to the other).

Graphical programming has become a powerful tool available to programmers. Graphical programming environments such as the National Instruments LabVIEW™ product have become very popular. Tools such as LabVIEW™ have greatly increased the productivity of programmers, and increasing numbers of programmers are using graphical programming environments to develop their software applications. In particular, graphical programming tools are being used for test and measurement, data acquisition, process control, human machine interface (HMI), supervisory control and data acquisition (SCADA) applications, modeling, simulation, image processing/machine vision applications, and motion control, among others.

SUMMARY OF THE INVENTION

Various embodiments are described of techniques for implementing pass-by-value variables as pass-by-reference in a program comprising one or more program structures. In some embodiments, this includes determining which value transfers with pass-by-value semantics can be changed to a pass-by-reference implementation without changing program functionality and dynamically changing those value transfers to pass-by-reference. For each variable at the entry and exit of each of the program structures, in some embodiments, a value transfer is implemented between variables via dynamic memory resource mapping, as presented below. Embodiments of a method for value transfer between variables via dynamic memory resource mapping may be performed as follows.

One or more value transfer operations in a program may be determined, where each value transfer operation specifies a value transfer between a respective one or more source variables and a destination variable. As used herein, the term "value transfer" refers to the assignment of the value of a first variable to a second variable. Thus, for example, for exemplary variables A and B, an example value transfer operation is A=B, where the value of variable B is transferred to variable A. In a pass-by-value transfer, the value of B may be copied to a memory associated with the variable A, while in a pass-by-reference transfer, a pointer associated with variable A may be transferred to a new memory location that contains the value of variable B. In one embodiment, at least one of the value transfer operations may operate in a static program or as part of a static program structure. In some embodiments, at least one of the value transfer operations may operate in a dynamic program or as part of a dynamic program structure. More generally, any combination of static and dynamic programs and program structures may be handled in accordance with the present techniques.

At least one of the one or more source variables or the destination variable may be shared by two or more program structures, e.g., loops, sequence structures, conditional or switch/case structures, and so forth. Moreover, the variables may have any type of data type desired. For example, each of the source variables and the destination variable may have a respective data type comprising one or more of: a numeric data type, an array, a cluster, an array of clusters, a struct, an array of structs, or a nested data type, among other data types.

Each of the one or more value transfer operations may be processed, where for each value transfer operation the value transfer operation may be implemented in accordance with the present techniques. In other words, the method may generate an implementation of each value transfer operation. In some embodiments, the above determining and processing may be performed at compile time, e.g., by a compiler as part of the compilation process.

In some embodiments, the implementation of each value transfer operation may be included in output code from the compiler. The output code may include instructions of a particular instruction set architecture that are executable by a processor. In other embodiments, the output code may be configured for programming a programmable hardware element to perform operations according to the implementation. Thus, in some embodiments, the implementation of each value transfer operation may be executable (or may be usable to configure a programmable hardware element) to assign each variable of the value transfer operation to a respective memory resource, thereby mapping the variables to the memory resources. In other words, the generated implementation of each value transfer operation may be executable to map each variable involved in the value transfer operation to a respective memory resource. Note that the memory resources may be of any type desired. For example, each memory resource may be or include one or more of: block random access memory (RAM) on a field programmable gate array (FPGA), distributed RAM on the FPGA, a flip flop on the FPGA or an application specific integrated circuit (ASIC), dynamic RAM (DRAM), or a solid-state drive (SSD), among other types of memory resources.

The implementation of each value transfer operation may be further executable to dynamically change the mapping, including assigning the destination variable to the memory resource of a first source variable of the one or more source variables, thereby transferring the value from the first source variable to the destination variable without copying the value between the memory resources. Thus, the computational expense of copying the value is avoided. Thus, embodiments of the method of FIG. 5 may shorten the time to execute variable assignments in a program, by (1) analyzing and finding specific variable assignments in a program, and (2) implementing the variable assignments by dynamically changing the mapping of variables to memory resources instead of copying values from one memory to another. Note that in various embodiments, a value may be singular or plural, e.g., may be a single value, or a collection of values, such as an array of values or values in any other plural data structure.

In some embodiments, a subset of the destination variables may be determined for which assigning the destination variable to a memory resource of a corresponding source variable does not disrupt the functionality of the program. For this subset of variables, the methods described above for dynamically changing the memory mapping may be implemented. In some embodiments, the subset of destination variables may be determined based on a memory resource requirement associated with the program.

In some embodiments, it may be determined whether the program operates according to a static schedule or a dynamic schedule. In response to determining that program operates according to a static schedule, variables may be collected into a group of related variables that transfer values across program structures. Variables in the group of related variables may have their lifetimes analyzed to determine temporal overlap of the lifetimes. In these embodiments, the subset of destination variables may be determined based on the temporal overlap of the lifetimes.

In some embodiments, it may be determined that the one or more program structures operate according to a dynamic schedule. In response to a determination that the one or more program structures operate according to a dynamic schedule, a segment dependency graph may be constructed based on the program structures. In some embodiments, a segment conflict graph may be extracted based on the segment dependency graph. In these embodiments, the memory resource requirement used for determining the subset of destination variables may be determined based on a maximum clique size of the segment conflict graph.

In some embodiments, the method may be performed by a compiler, i.e., may be performed as part of compiling the program. In one embodiment, the method may further include specifying a respective memory resource for each of the source variables and the destination variable. In other words, at compile time, the method may provide an initial mapping of the source and destination variables to respective memory resources.

In some embodiments, the above techniques may be implemented at least in part by a memory resource mapping manager, although it should be noted that this name is meant to be illustrative only, and that any other name may be used as desired. More specifically, in one embodiment, the method may further include, e.g., as part of compiling the program, creating a memory resource mapping manager, where the memory resource mapping manager is configured to assign a mapping of the source variables and the destination variable to their respective memory resources at runtime. Accordingly, the implementation of the program may include an implementation of the memory resource mapping manager. Moreover, references to the source variables and the destination variable in the implementation of the program may be replaced with respective memory resource lookup operations. In other words, references to the variables of each value transfer operation specified in the program may be replaced (in the implementation of the program) with corresponding memory resource lookup operations.

The implementation of the memory resource mapping manager may be configured to, at runtime, assign a respective specified memory resource to each of the source variables and the destination variable, including assigning a first memory resource to the destination variable and assigning one or more second memory resources to the one or more source variables, respectively. Additionally, the implementation of the memory resource mapping manager may be configured to perform each value transfer operation (also at runtime). In some embodiments, for each value transfer operation, performing the value transfer operation may include changing the mapping. For example, changing the mapping may include assigning the memory resource of a first source variable of the one or more source variables to the destination variable, thereby transferring the value of the first source variable to the destination variable without copying the value between the memory resources.

In some embodiments, the method may further include deploying the implementation of the program to a hardware device. The deployed implementation may configure the hardware device to assign, e.g., by the implementation of the memory resource mapping manager, the respective specified memory resource to each of the one or more source variables and the destination variable. This assignment may include the above assigning a first memory resource to the destination variable and assigning one or more second memory resources to the one or more source variables, respectively. The deployed implementation may be further executable on the hardware device to execute, by the implementation of the memory resource mapping manager, the value transfer operation, which may include changing the mapping, where, as described above, changing the mapping may include assigning the memory resource of the first source variable of the one or more source variables to the destination variable, wherein said assigning the memory resource transfers the value of the first source variable to the destination variable without copying the value between the memory resources. In other words, when deployed, the implementation may operate as it was configured to do.

In various embodiments, the memory resource mapping manager may be implemented in any of a variety of ways, including, but not limited to, one or more of: a finite state machine (FSM), one hot counter, a binary counter, a scoreboard, or a program executed on an embedded core, among others.

In some embodiments, compiling the program may further include analyzing effects of the dynamically changing the mapping on each value transfer operation with respect to performance improvement and/or resource cost. Based on this analysis, value transfer operations used in the dynamically changing the mapping that achieve a specified timing and/or resource constraint may be determined. Expressed another way, determining one or more value transfer operations in the program may be based on estimation of performance improvement and/or resource cost that is achievable by implementing said value transfer operations via said dynamically changing the mapping.

Thus, various embodiments of the above techniques may provide for efficient value transfer in programs.

BRIEF DESCRIPTION OF THE DRAWINGS

A better understanding of the present invention can be obtained when the following detailed description of the preferred embodiment is considered in conjunction with the following drawings, in which:

FIG. 1A illustrates a computer system configured to execute a graphical program according to an embodiment of the present invention;

Figure 1B:
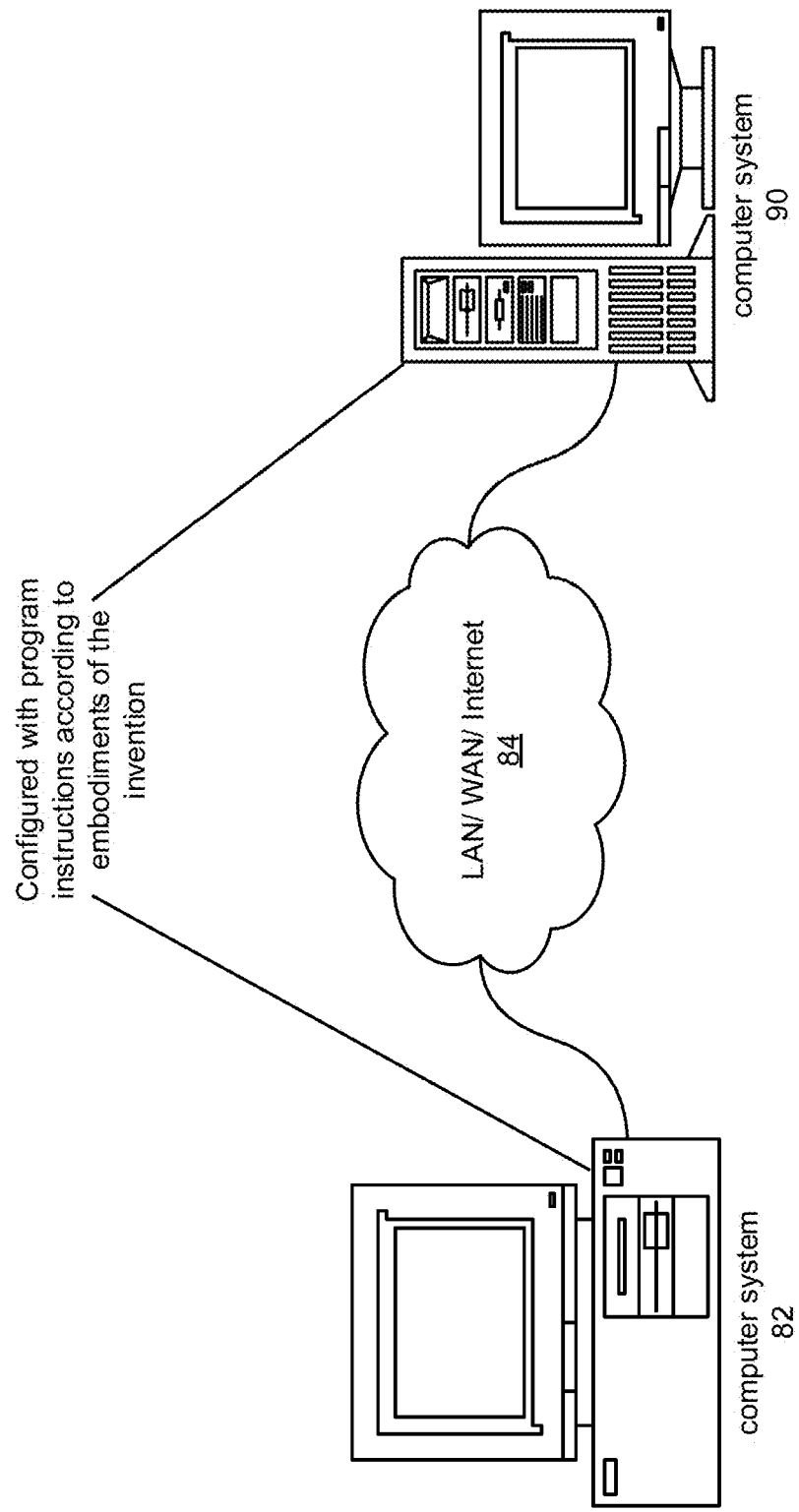
FIG. 1B illustrates a network system comprising two or more computer systems that may implement an embodiment of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Terms

The following is a glossary of terms used in the present application:

Memory Medium—Any of various types of non-transitory computer accessible memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Program—the term "program" is intended to have the full breadth of its ordinary meaning. The term "program" includes 1) a software program which may be stored in a memory and is executable by a processor or 2) a hardware configuration program useable for configuring a programmable hardware element.

Graphical Program—A program comprising a plurality of interconnected nodes or icons, wherein the plurality of interconnected nodes or icons visually indicate functionality of the program. The interconnected nodes or icons are graphical source code for the program. Graphical function nodes may also be referred to as blocks.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW®, DasyLab™, DIADem™ and Matrixx/SystemBuild™ from National Instruments, Simulink® from the MathWorks, VEE™ from Agilent, WiT™ from Coreco, Vision Program Manager™ from PPT Vision, SoftWIRE™ from Measurement Computing, Sanscript™ from Northwoods Software, Khoros™ from Khoral Research, SnapMaster™ from HEM Data, VisSim™ from Visual Solutions, ObjectBench™ by SES (Scientific and Engineering Software), and VisiDAQ™ from Advantech, among others.

The term "graphical program" includes models or block diagrams created in graphical modeling environments, wherein the model or block diagram comprises interconnected blocks (i.e., nodes) or icons that visually indicate operation of the model or block diagram; exemplary graphical modeling environments include Simulink®, SystemBuild™, VisSim™, Hypersignal Block Diagram™, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected blocks or nodes are often referred to as the block diagram portion of the graphical program.

Node—In the context of a graphical program, an element that may be included in a graphical program. The graphical program nodes (or simply nodes) in a graphical program may also be referred to as blocks. A node may have an associated icon that represents the node in the graphical program, as well as underlying code and/or data that implements functionality of the node. Exemplary nodes (or blocks) include function nodes, sub-program nodes, terminal nodes, structure nodes, etc. Nodes may be connected together in a graphical program by connection icons or wires.

Data Flow Program—A Software Program in which the program architecture is that of a directed graph specifying the flow of data through the program, and thus functions execute whenever the necessary input data are available. Said another way, data flow programs execute according to a data flow model of computation under which program functions are scheduled for execution in response to their necessary input data becoming available. Data flow programs can be contrasted with procedural programs, which specify an execution flow of computations to be performed. As used herein "data flow" or "data flow programs" refer to "dynamically-scheduled data flow" and/or "statically-defined data flow".

Graphical Data Flow Program (or Graphical Data Flow Diagram)—A Graphical Program which is also a Data Flow Program. A Graphical Data Flow Program comprises a plurality of interconnected nodes (blocks), wherein at least a subset of the connections among the nodes visually indicate that data produced by one node is used by another node. A LabVIEW™ VI is one example of a graphical data flow program. A Simulink block diagram is another example of a graphical data flow program.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the HMI (Human Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators.

Input Control—a graphical user interface element for providing user input to a program. An input control displays the value input by the user and is capable of being manipulated at the discretion of the user. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are configured to acquire and/or store data. A measurement device may also optionally be further configured to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further configured to perform control functions, e.g., in response to analysis of the acquired or stored data. For example, the measurement device may send a control signal to an external system, such as a motion control system or to a sensor, in response to particular data. A measurement device may also be configured to perform automation functions, i.e., may receive and analyze data, and issue automation control signals in response.

Functional Unit (or Processing Element)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Wireless—refers to a communications, monitoring, or control system in which electromagnetic or acoustic waves carry a signal through space rather than along a wire.

Approximately—refers to a value being within some specified tolerance or acceptable margin of error or uncertainty of a target value, where the specific tolerance or margin is generally dependent on the application. Thus, for example, in various applications or embodiments, the term approximately may mean: within 0.1% of the target value, within 0.2% of the target value, within 0.5% of the target value, within 1%, 2%, 5%, or 10% of the target value, and so forth, as required by the particular application of the present techniques.

Proximate—near to; For example, proximate may mean within some specified distance, or within some specified fraction of a distance. Note that the actual threshold for being proximate is generally application dependent. Thus, in various applications, proximate may mean being within 1 mm, 1 inch, 1 foot, 1 meter, 1 mile, etc. of some reference point or object, or may refer to being within 1%, 2%, 5%, 10%, etc., of a reference distance from some reference point or object.

Optimization—refers to the technical process of determining or selecting a best or improved element or configuration from a set of available alternatives with regard to some specified criteria (e.g., an objective function, and possibly constraints), and generally within some specified tolerance. Note that in practical use, an optimized system (or process) is improved (with respect to specified criteria), but may or may not be the absolute best or ideal solution. Said another way, optimization operates to improve a system or process, and may approach the mathematically optimum solution to within some tolerance, which may be dependent on the application, e.g., within 1%, 2%, 5%, 10%, etc., of the mathematically optimal solution. Thus, as used herein, the terms "optimized", "optimum", and "optimal" mean "improved with respect to specified criteria".

Global Optimization—refers to a type of optimization in which a system or process with interdependent components or sub-processes is improved by varying multiple parameters or aspects of the system or process at the same time, generally with non-linear results. Note that ideal global optimization (finding the mathematically globally optimum solution) is generally intractable, because in even moderately complex systems and processes there are many more possible configurations and resulting behaviors than can be searched or considered in a reasonable amount of time. Thus, practically, global optimization operates to improve a complex system or process by varying multiple parameters concurrently, and may approach the mathematically globally optimum solution to within some tolerance, which may be dependent on the application, e.g., within 1%, 2%, 5%, 10%, etc., of the mathematically globally optimal solution. Thus, as used herein, the terms "globally optimized", "globally optimum", and "globally optimal" mean "globally improved with respect to specified criteria". One example of a global optimization method is differential evolution, which optimizes a problem (system or process) via iterative improvement of candidate solutions with respect to some specified measure of quality.

Addressing Pattern—refers to a list of array addresses accessed in running a program. This pattern is known only if the program accesses a finite number of addresses of array in a periodic way. The list is ordered in time and only periodic sequences of values are listed in the pattern.

FIG. 1A—Computer System

FIG. 1A illustrates a computer system 82 configured to implement embodiments of the present techniques. Embodiments of a technique for value transfer between variable using dynamic memory resource mapping are described below.

As shown in FIG. 1A, the computer system 82 may include a display device configured to display a program, e.g., a textual or graphical program, as the program is created and/or executed. The display device may also be configured to display a graphical user interface or front panel of the program during execution of the program. The graphical user interface may comprise any type of graphical user interface, e.g., depending on the computing platform.

The computer system 82 may include at least one memory medium on which one or more computer programs or software components according to one embodiment of the present invention may be stored. For example, the memory medium may store one or more programs which are executable to perform the methods described herein. Additionally, the memory medium may store a programming development environment application used to create and/or execute such programs. The memory medium may also store operating system software, as well as other software for operation of the computer system. Various embodiments further include receiving or storing instructions and/or data implemented in accordance with the foregoing description upon a carrier medium.

FIG. 1B—Computer Network

FIG. 1B illustrates a system including a first computer system 82 that is coupled to a second computer system 90. The computer system 82 may be coupled via a network 84 (or a computer bus) to the second computer system 90. The computer systems 82 and 90 may each be any of various types, as desired. The network 84 can also be any of various types, including a LAN (local area network), WAN (wide area network), the Internet, or an Intranet, among others. The computer systems 82 and 90 may execute a program, e.g., a graphical program, in a distributed fashion. For example, in graphical program embodiments, computer 82 may execute a first portion of the block diagram of a graphical program and computer system 90 may execute a second portion of the block diagram of the graphical program. As another example, computer 82 may display the graphical user interface of a graphical program and computer system 90 may execute the block diagram of the graphical program.

In one embodiment, the graphical user interface of the graphical program may be displayed on a display device of the computer system 82, and the block diagram may execute on a device coupled to the computer system 82. The device may include a programmable hardware element and/or may include a processor and memory medium which may execute a real time operating system. In one embodiment, the graphical program may be downloaded and executed on the device. For example, an application development environment with which the graphical program is associated may provide support for downloading a graphical program for execution on the device in a real time system. As noted above, the present techniques apply broadly to textual programs, as well.

More generally, embodiments of the techniques described herein may be implemented in, on, or by any type of hardware desired, e.g., one or more CPUs (central processing units), GPU's (graphics processing units), FPGAs (field programmable gate arrays), separate computers on a network, cloud based systems, ASICs (application specific integrated circuits), and so forth.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications where the graphical program may be used include hardware-in-the-loop testing and rapid control prototyping, among others.

However, it is noted that embodiments of the present invention can be used for a plethora of applications and is not limited to the above applications. In other words, applications discussed in the present description are exemplary only, and embodiments of the present invention may be used in any of various types of systems. Thus, embodiments of the system and method of the present invention is configured to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

Figure 2A:
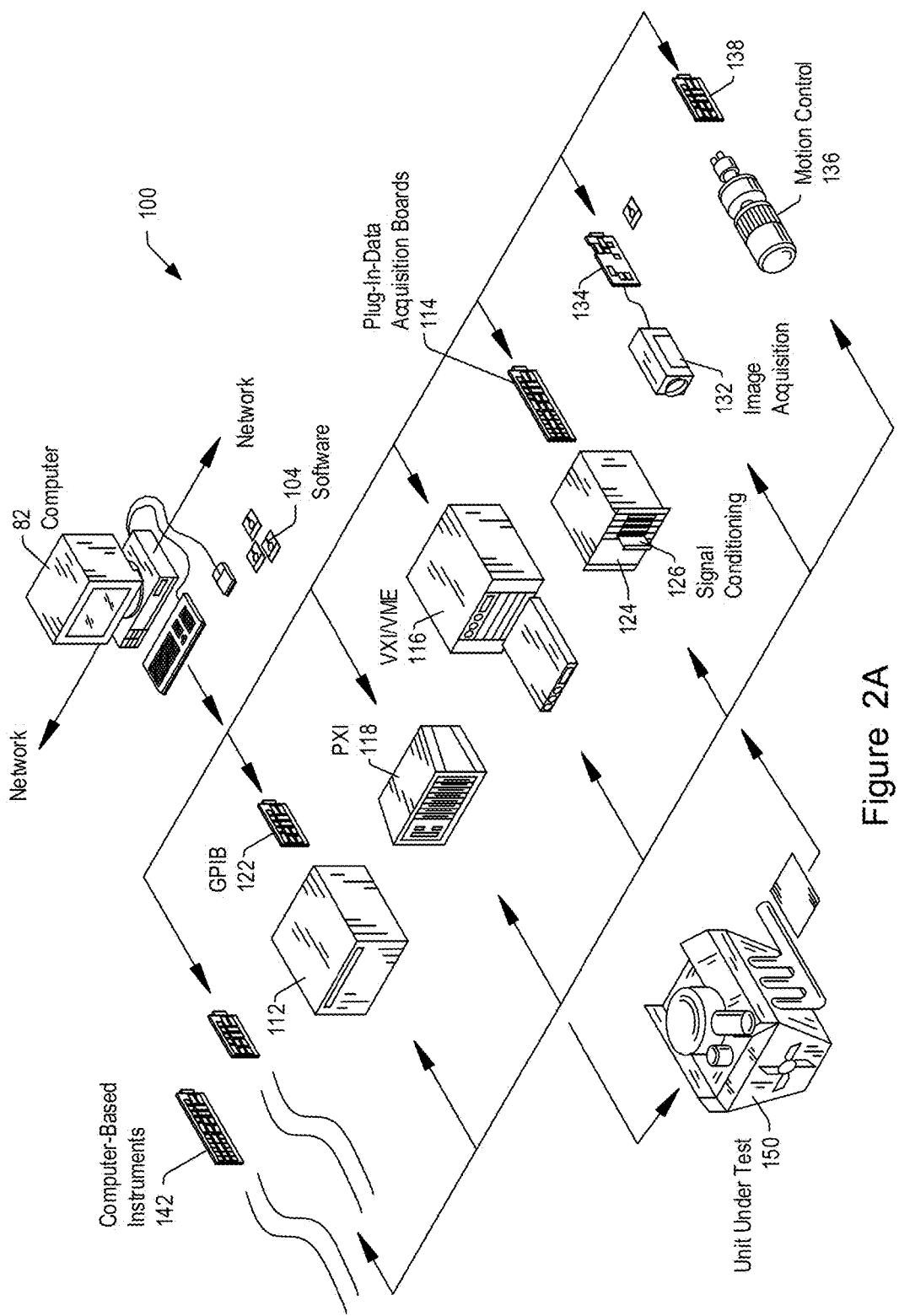
FIG. 2A illustrates an instrumentation control system according to one embodiment of the invention.

FIG. 2A illustrates an exemplary instrumentation control system 100 which may implement embodiments of the invention. The system 100 comprises a host computer 82 which couples to one or more instruments. The host computer 82 may comprise a CPU, a display screen, memory, and one or more input devices such as a mouse or keyboard as shown. The computer 82 may operate with the one or more instruments to analyze, measure or control a unit under test (UUT) or process 150, e.g., via execution of software 104.

The one or more instruments may include a GPIB instrument 112 and associated GPIB interface card 122, a data acquisition board 114 inserted into or otherwise coupled with chassis 124 with associated signal conditioning circuitry 126, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to the unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

Figure 2B:
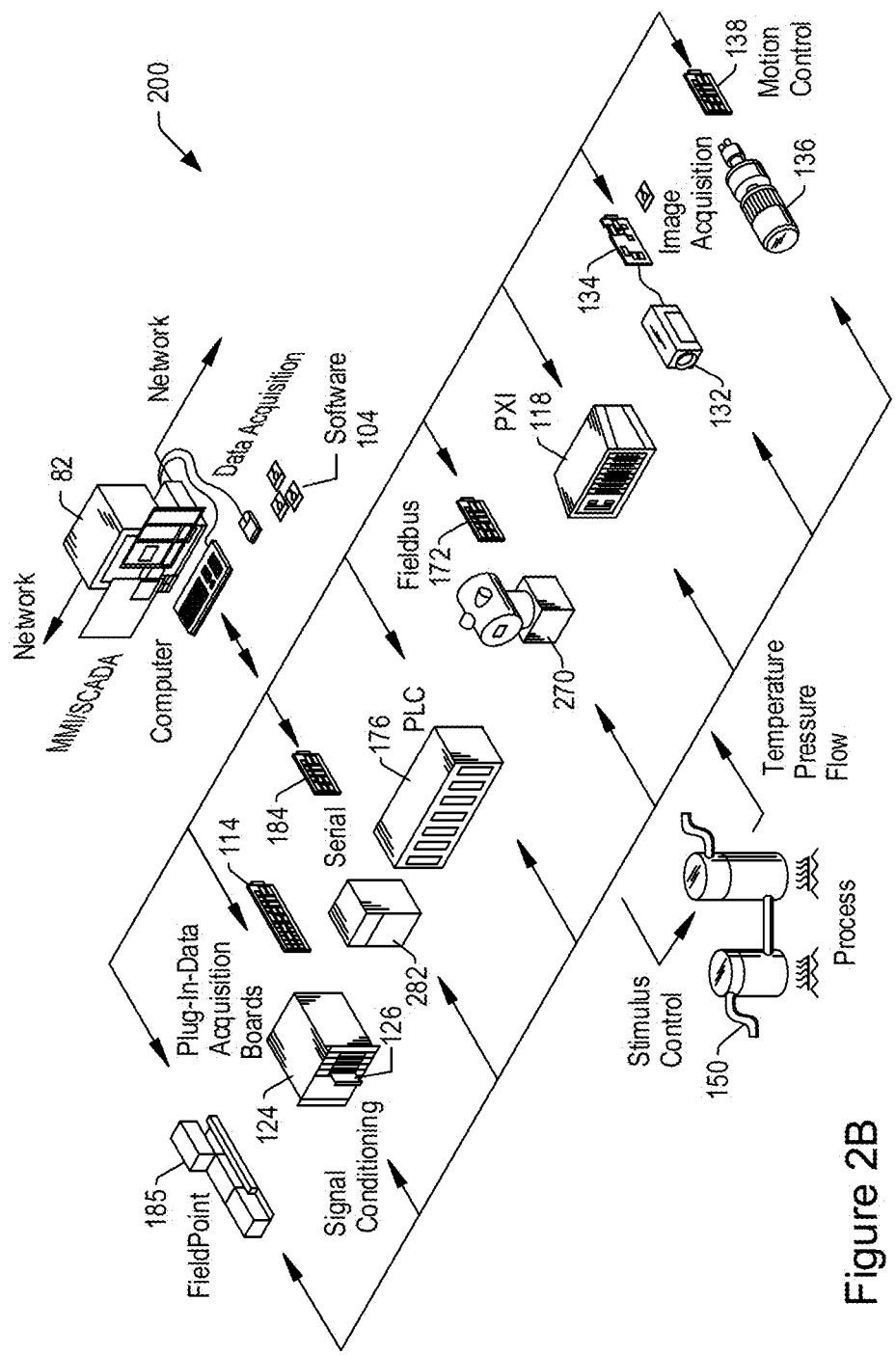
FIG. 2B illustrates an industrial automation system according to one embodiment of the invention.

FIG. 2B illustrates an exemplary industrial automation system 200 which may implement embodiments of the invention. The industrial automation system 200 is similar to the instrumentation or test and measurement system 100 shown in FIG. 2A. Elements which are similar or identical to elements in FIG. 2A have the same reference numerals for convenience. The system 200 may comprise a computer 82 which couples to one or more devices or instruments. The computer 82 may comprise a CPU, a display screen, memory, and one or more input devices such as a mouse or keyboard as shown. The computer 82 may operate with the one or more devices to perform an automation function with respect to a process or device 150, such as HMI (Human Machine Interface), SCADA (Supervisory Control and Data Acquisition), portable or distributed data acquisition, process control, advanced analysis, or other control, among others, e.g., via execution of software 104.

The one or more devices may include a data acquisition board 114 inserted into or otherwise coupled with chassis 124 with associated signal conditioning circuitry 126, a PXI instrument 118, a video device 132 and associated image acquisition card 134, a motion control device 136 and associated motion control interface card 138, a fieldbus device 270 and associated fieldbus interface card 172, a PLC (Programmable Logic Controller) 176, a serial instrument 282 and associated serial interface card 184, or a distributed data acquisition system, such as Fieldpoint system 185, available from National Instruments Corporation, among other types of devices.

Figure 3A:
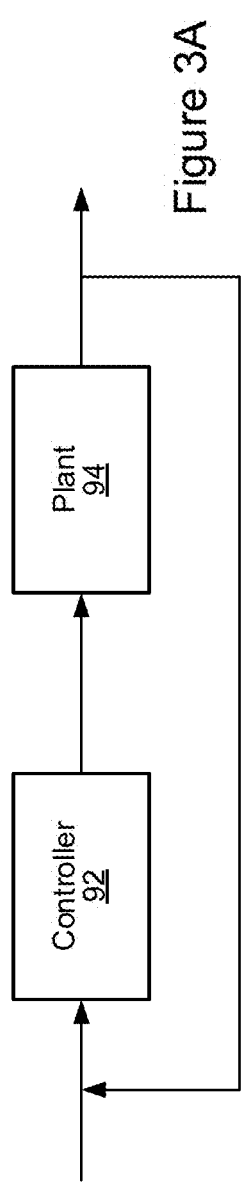
FIG. 3A is a high level block diagram of an exemplary system which may execute or utilize graphical programs.

FIG. 3A is a high level block diagram of an exemplary system which may execute or utilize graphical programs. FIG. 3A illustrates a general high-level block diagram of a generic control and/or simulation system which comprises a controller 92 and a plant 94. The controller 92 represents a control system/algorithm the user may be trying to develop. The plant 94 represents the system the user may be trying to control. For example, if the user is designing an ECU for a car, the controller 92 is the ECU and the plant 94 is the car's engine (and possibly other components such as transmission, brakes, and so on.) As shown, a user may create a graphical program that specifies or implements the functionality of one or both of the controller 92 and the plant 94. For example, a control engineer may use a modeling and simulation tool to create a model (e.g., graphical program) of the plant 94 and/or to create the algorithm (e.g., graphical program) for the controller 92.

Figure 3B:
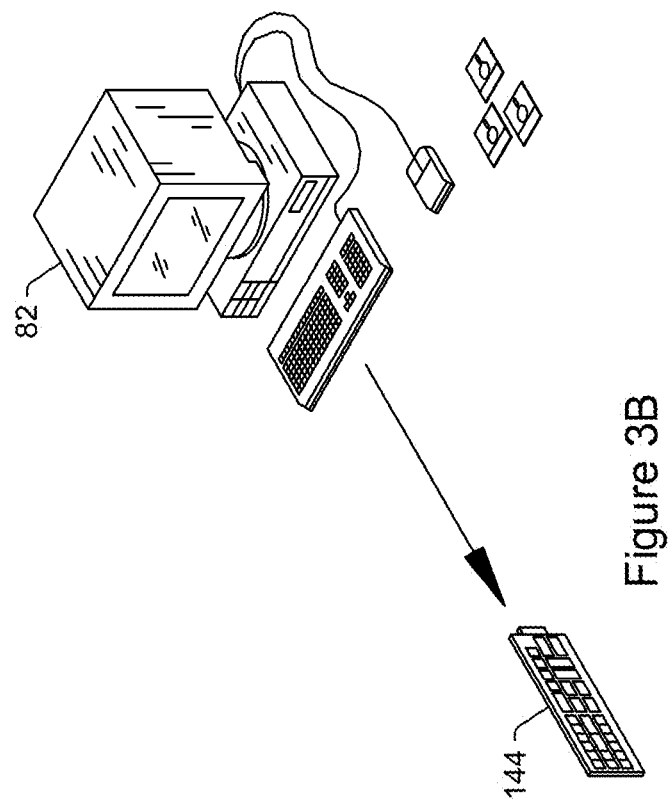
FIG. 3B illustrates an exemplary system which may perform control and/or simulation functions utilizing graphical programs.

FIG. 3B illustrates an exemplary system which may perform control and/or simulation functions. As shown, the controller 92 may be implemented by a computer system 82 or other device (e.g., including a processor and memory medium and/or including a programmable hardware element) that executes or implements a program, e.g., a graphical program. In a similar manner, the plant 94 may be implemented by a computer system or other device 144 (e.g., including a processor and memory medium and/or including a programmable hardware element) that executes or implements a program, or may be implemented in or as a real physical system, e.g., a car engine.

In one embodiment of the invention, one or more programs may be created which are used in performing rapid control prototyping. Rapid Control Prototyping (RCP) generally refers to the process by which a user develops a control algorithm and quickly executes that algorithm on a target controller connected to a real system. The user may develop the control algorithm using a program, e.g., a graphical program, and the program may execute on the controller 92, e.g., on a computer system or other device. The computer system 82 may be a platform that supports real time execution, e.g., a device including a processor that executes a real time operating system (RTOS), or a device including a programmable hardware element.

In one embodiment of the invention, one or more programs may be created which are used in performing Hardware in the Loop (HIL) simulation. Hardware in the Loop (HIL) refers to the execution of the plant model 94 in real time to test operation of a real controller 92. For example, once the controller 92 has been designed, it may be expensive and complicated to actually test the controller 92 thoroughly in a real plant, e.g., a real car. Thus, the plant model (implemented by a program) is executed in real time to make the real controller 92 "believe" or operate as if it is connected to a real plant, e.g., a real engine.

In the embodiments of FIGS. 2A, 2B, and 3B above, one or more of the various devices may couple to each other over a network, such as the Internet. In one embodiment, the user operates to select a target device from a plurality of possible target devices for programming or configuration using a program. Thus the user may create a program on a computer and use (execute) the program on that computer or deploy the program to a target device (for remote execution on the target device) that is remotely located from the computer and coupled to the computer through a network.

Graphical software programs which perform data acquisition, analysis and/or presentation, e.g., for measurement, instrumentation control, industrial automation, modeling, or simulation, such as in the applications shown in FIGS. 2A and 2B, may be referred to as virtual instruments.

Figure 4:
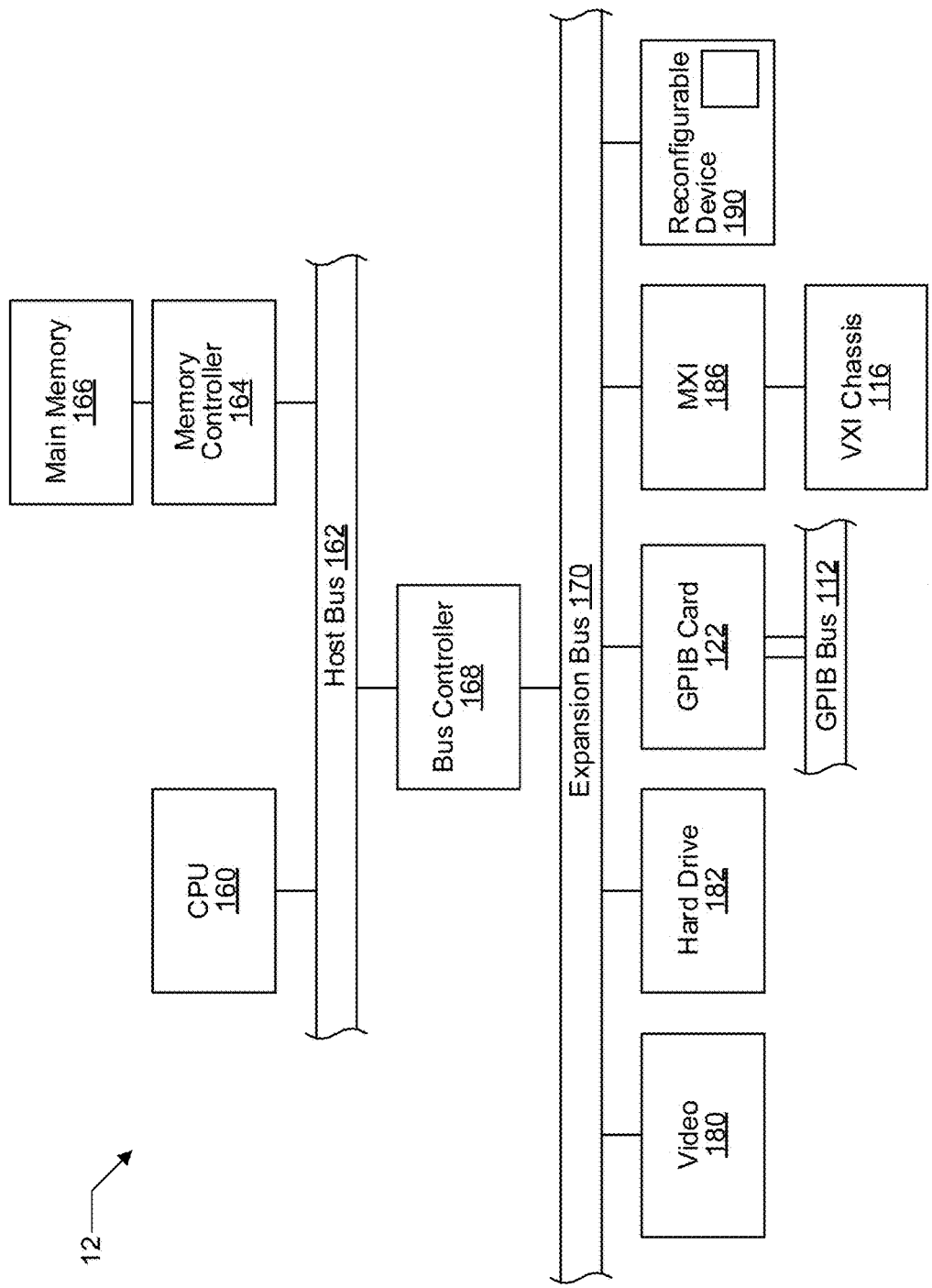
FIG. 4 is an exemplary block diagram of the computer systems of FIGS. 1A, 1B, 2A and 2B and 3B.

FIG. 4—Computer System Block Diagram

FIG. 4 is a block diagram 12 representing one embodiment of the computer system 82 and/or 90 illustrated in FIGS. 1A and 1B, or computer system 82 shown in FIG. 2A or 2B. It is noted that any type of computer system configuration or architecture can be used as desired, and FIG. 4 illustrates a representative PC embodiment. It is also noted that the computer system may be a general purpose computer system, a computer implemented on a card installed in a chassis, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. A memory medium, typically comprising RAM and referred to as main memory, 166 is coupled to the host bus 162 by means of memory controller 164. The main memory 166 may store one or more programs configured to implement embodiments of the techniques disclosed herein. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further comprises a video display subsystem 180 and hard drive 182 coupled to the expansion bus 170. The computer 82 may also comprise a GPIB card 122 coupled to a GPIB bus 112, and/or an MXI device 186 coupled to a VXI chassis 116.

As shown, a device 190 may also be connected to the computer. The device 190 may include a processor and memory which may execute a real time operating system. The device 190 may also or instead comprise a programmable hardware element. The computer system may be configured to deploy a program, e.g., a graphical program, to the device 190 for execution of the program on the device 190. In graphical program embodiments, the deployed graphical program may take the form of graphical program instructions or data structures that directly represents the graphical program. Alternatively, the deployed graphical program may take the form of text code (e.g., C code) generated from the graphical program. As another example, the deployed graphical program may take the form of compiled code generated from either the graphical program or from text code that in turn was generated from the graphical program.

Figure 5:
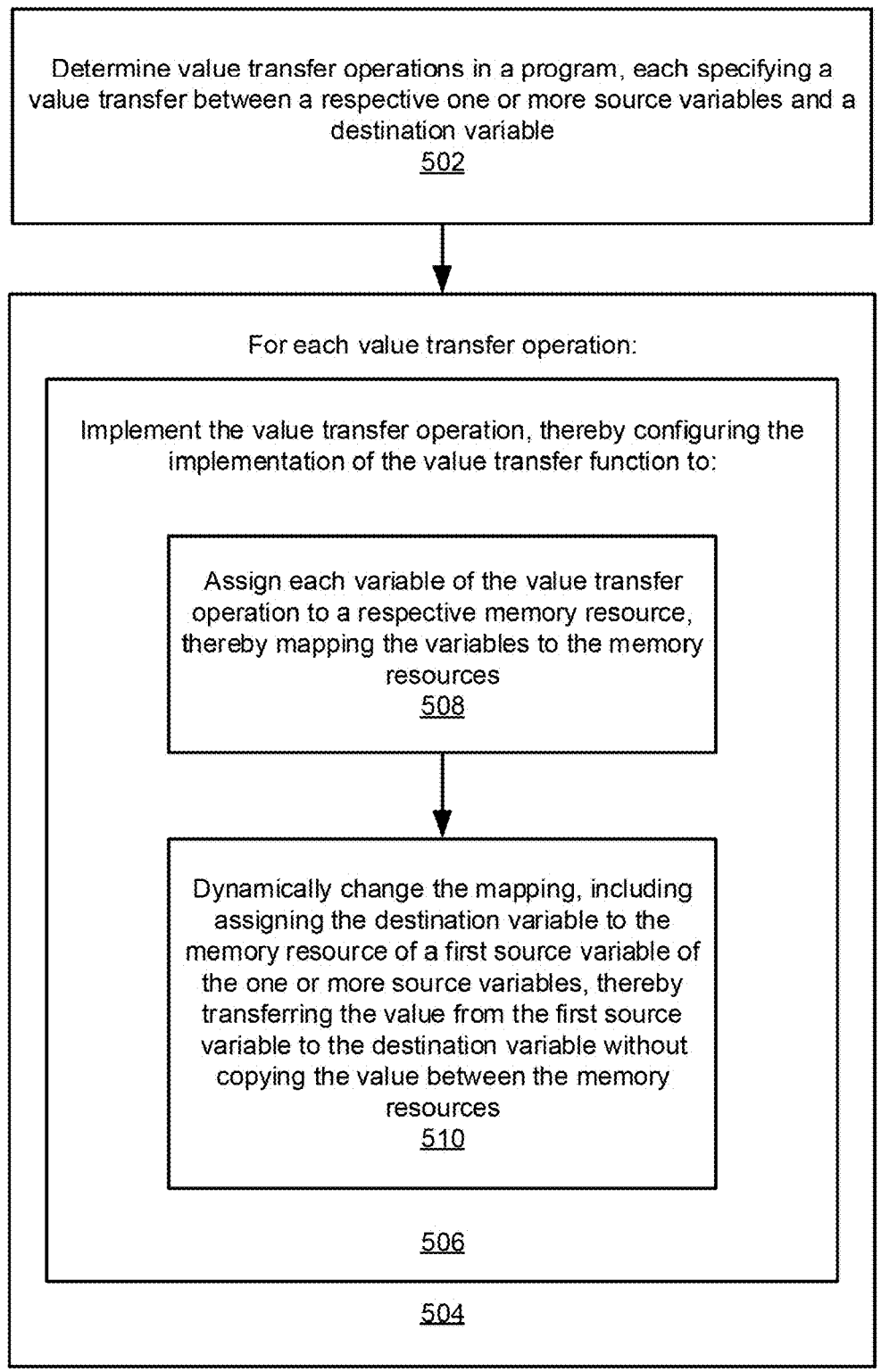
FIG. 5 is a flowchart diagram illustrating one embodiment of a method for performing value transfer operations in a program via dynamic memory resource mapping.

FIG. 5—Method for Transferring Values Between Variables Via Dynamic Memory Resource Mapping FIG. 5 is a high level flowchart of a method for performing value transfer between variables via dynamic memory resource mapping, according to some embodiments. The method shown in FIG. 5 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

First, in 502, one or more value transfer operations in a program may be determined, where each value transfer operation specifies a value transfer between a respective one or more source variables and a destination variable. As used herein, the term "value transfer" refers to the assignment of the value of a first variable to a second variable. Thus, for example, for exemplary variables A and B, an example value transfer operation is A=B, where the value of variable B is transferred to variable A. In some embodiments, at least one of the value transfer operations may operate in a dynamic program or as part of a dynamic program structure. More generally, any combination of static and dynamic programs and program structures may be handled in accordance with the present techniques.

Each variable entering the program structure may specify a value transfer from outside the program structure to inside the program structure, and each variable exiting the program structure may specify a value transfer from inside the program structure to outside the program structure. Each value transfer may comprise a value transfer from one or more source variables to a destination variable. For example, for a variable entering the program structure, the one or more source variables may be outside the program structure while the destination variable may be inside the program structure. Conversely, for a variable exiting the program structure, the one or more source variables may be inside the program structure while the destination variable may be outside the program structure.

In one embodiment, at least one of the one or more source variables or the destination variable may be shared by two or more program structures, e.g., loops, sequence structures, conditional or switch/case structures, and so forth. Moreover, the variables may have any type of data type desired. For example, each of the source variables and the destination variable may have a respective data type comprising one or more of: a numeric data type, an array, a cluster, an array of clusters, a struct, an array of structs, or a nested data type, among other data types.

In 504, the method may process each of the one or more value transfer operations, where for each value transfer operation the value transfer operation may be implemented in accordance with the present techniques, as indicated in 506. In other words, the method may generate an implementation of each value transfer operation. In some embodiments, method elements 502 and 504 (including 506) may be performed at compile time, e.g., by a compiler as part of the compilation process.

In some embodiments, the implementation of each value transfer operation may be executable to assign each variable of the value transfer operation to a respective memory resource, thereby mapping the variables to the memory resources, as indicated in 508. In other words, the generated implementation of each value transfer operation may be executable to map each variable involved in the value transfer operation to a respective memory resource. Note that the memory resources may be of any type desired. For example, each memory resource may be or include one or more of: block random access memory (RAM) on a field programmable gate array (FPGA), distributed RAM on the FPGA, a flip flop on the FPGA or an application specific integrated circuit (ASIC), dynamic RAM (DRAM), or a solid-state drive (SSD), among other types of memory resources.

As method element 510 indicates, the implementation of each value transfer operation may be further executable to dynamically change the mapping, including assigning the destination variable to the memory resource of a first source variable of the one or more source variables, thereby transferring the value from the first source variable to the destination variable without copying the value between the memory resources. Thus, the computational expense of copying the value is avoided. Thus, embodiments of the method of FIG. 5 may shorten the time to execute variable assignments in a program, by (1) analyzing and finding specific variable assignments in a program, and (2) implementing the variable assignments by dynamically changing the mapping of variables to memory resources instead of copying values from one memory to another. Note that in various embodiments, a value may be singular or plural, e.g., may be a single value, or a collection of values, such as an array of values or values in any other plural data structure.

As noted above, in some embodiments, the method of FIG. 5 may be performed by a compiler, i.e., may be performed as part of compiling the program. In one embodiment, the method may further include specifying a respective memory resource for each of the source variables and the destination variable. In other words, at compile time, the method may provide an initial mapping of the source and destination variables to respective memory resources.

The following textual (source) code block specifies an exemplary assignment or value transfer between a single source variable and a single destination variable.

Code Block 1

```
void Main( )
{
// The return from FunctionA becomes the input argument to FunctionB
    int[ ] array0 = FunctionA( );
    int[ ] array1 = FunctionB(array0);
}
```

As may be seen, the assignment of value(s) to integer array array1 relies on the runtime execution of FunctionA, in that executing FunctionA returns the value(s) for integer array array0, which is then provided to FunctionB, which returns the value(s) assigned to array1. In other words, it is only at runtime that the specified assignments occur.

Figure 6A:
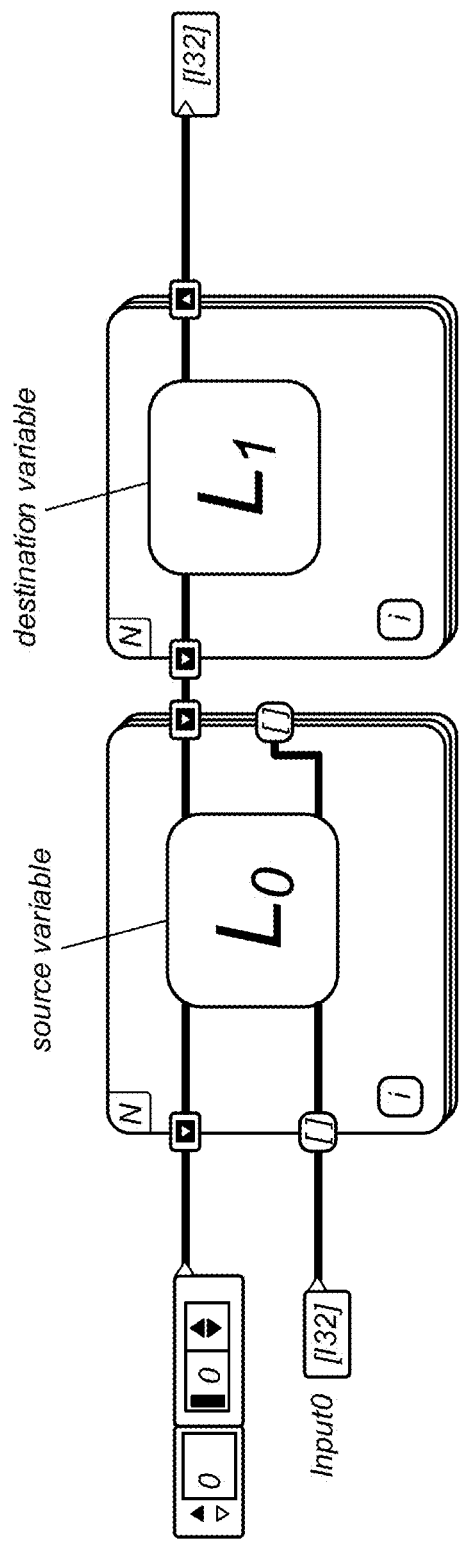
FIG. 6A illustrates an exemplary assignment from a single source variable to a single destination variable in a graphical program, according to one embodiment.

FIG. 6A illustrates a graphical program embodiment of the exemplary assignment of code block 1, according to one embodiment, e.g., in the LabVIEW™ graphical programming language provided by National Instruments Corporation. As indicated, in this example graphical program (source) code, source variable $L_0$ is assigned to destination variable $L_1$. Note that in the exemplary graphical program code shown, execution flows from left to right, and so the value of the source variable $L_0$ is transmitted and assigned to the destination variable $L_1$.

The following textual (source) code block specifies an exemplary assignment or value transfer between multiple source variables and a single destination variable across function calls.

Code Block 2

```
int[ ] ArraySelector(int[ ] inArray0, int[ ] inArray1, bool sel)
{
    int[ ] outArray;
    if(sel) {outArray = inArray0;}
    else {outArray = inArray1;}
    return outArray;
}
```

As shown, in this exemplary code block, depending on the value of a Boolean selection parameter (sel) passed in to the code block, the code block returns one of two input arrays, inArray0 or inArray1. In other words, the assignment to the output array outArray branches based on the (Boolean) selector value.

Figure 6B:
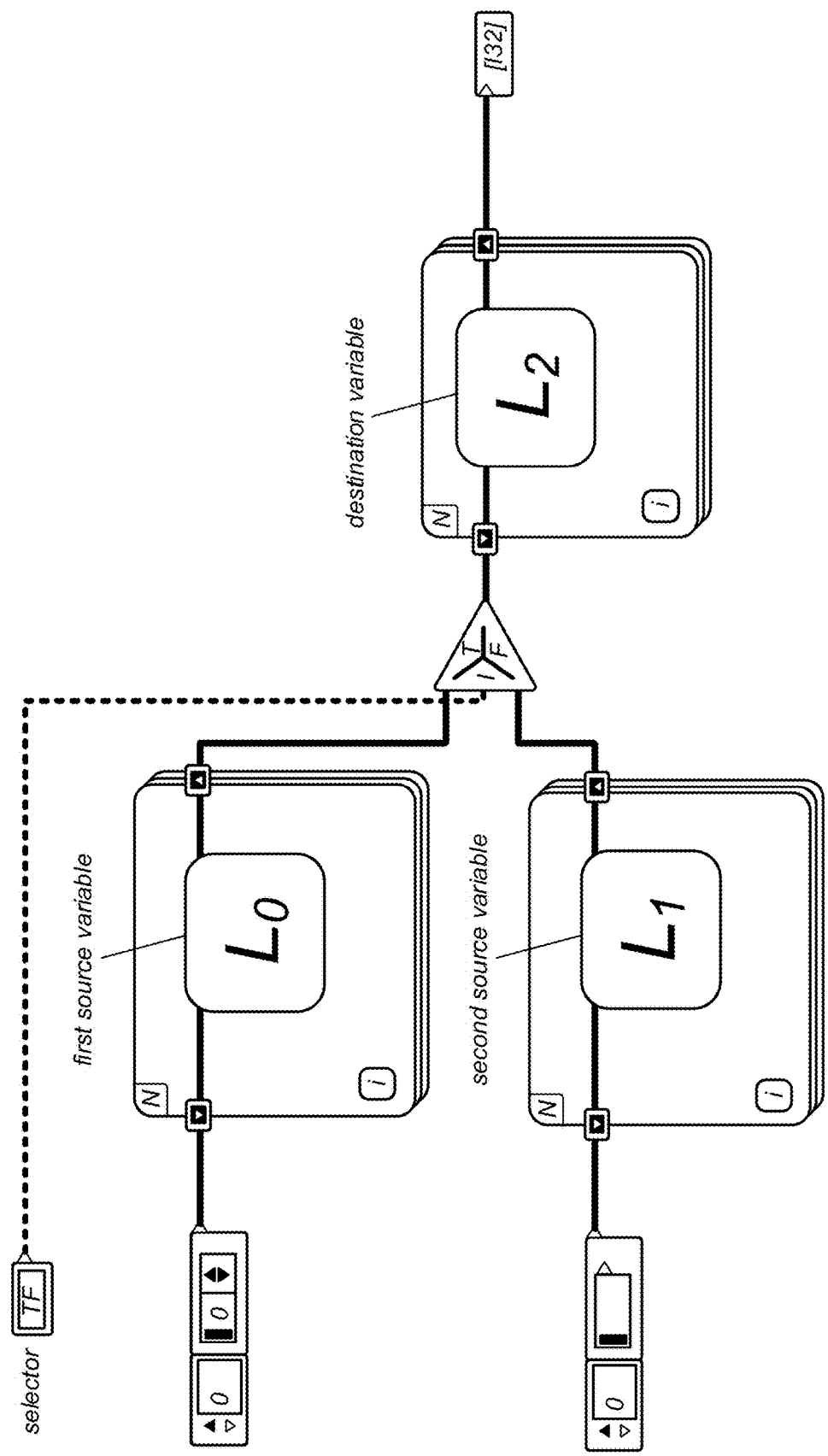
FIG. 6B illustrates an exemplary assignment from multiple source variables to a single destination variable in a graphical program, according to one embodiment.

FIG. 6B illustrates the exemplary assignment of code block 2 specified in a graphical programming language, such as LabVIEW™ provided by National Instruments Corporation, according to one embodiment. As FIG. 6B shows, (again, flowing from left to right) the value of one of first and second source variables, $L_0$ and $L_1$, is assigned to destination variable $L_2$ based on the value of a selector, so labeled, which is provided to a conditional node or element, and which in turn provides the selected value (from either $L_0$ or $L_1$) to destination variable $L_2$ for assignment.

In some embodiments, the above technique may be implemented at least in part by a memory resource mapping manager, although it should be noted that this name is meant to be illustrative only, and that any other name may be used as desired. More specifically, in one embodiment, the method of FIG. 5 may further include, e.g., as part of compiling the program, creating a memory resource mapping manager, where the memory resource mapping manager is configured to assign a mapping of the source variables and the destination variable to their respective memory resources at runtime. Accordingly, the implementation of the program may include an implementation of the memory resource mapping manager. Moreover, references to the source variables and the destination variable in the implementation of the program may be replaced with respective memory resource lookup operations. In other words, references to the variables of each value transfer operation specified in the program may be replace (in the implementation of the program) with corresponding memory resource lookup operations.

The implementation of the memory resource mapping manager may be configured to, at runtime, assign a respective specified memory resource to each of the source variables and the destination variable, including assigning a first memory resource to the destination variable and assigning one or more second memory resources to the one or more source variables, respectively. Additionally, the implementation of the memory resource mapping manager may be configured to execute each value transfer operation (also at runtime). In some embodiments, for each value transfer operation, executing the value transfer operation may include changing the mapping. For example, changing the mapping may include assigning the memory resource of a first source variable of the one or more source variables to the destination variable, thereby transferring the value of the first source variable to the destination variable without copying the value between the memory resources.

Figure 7:
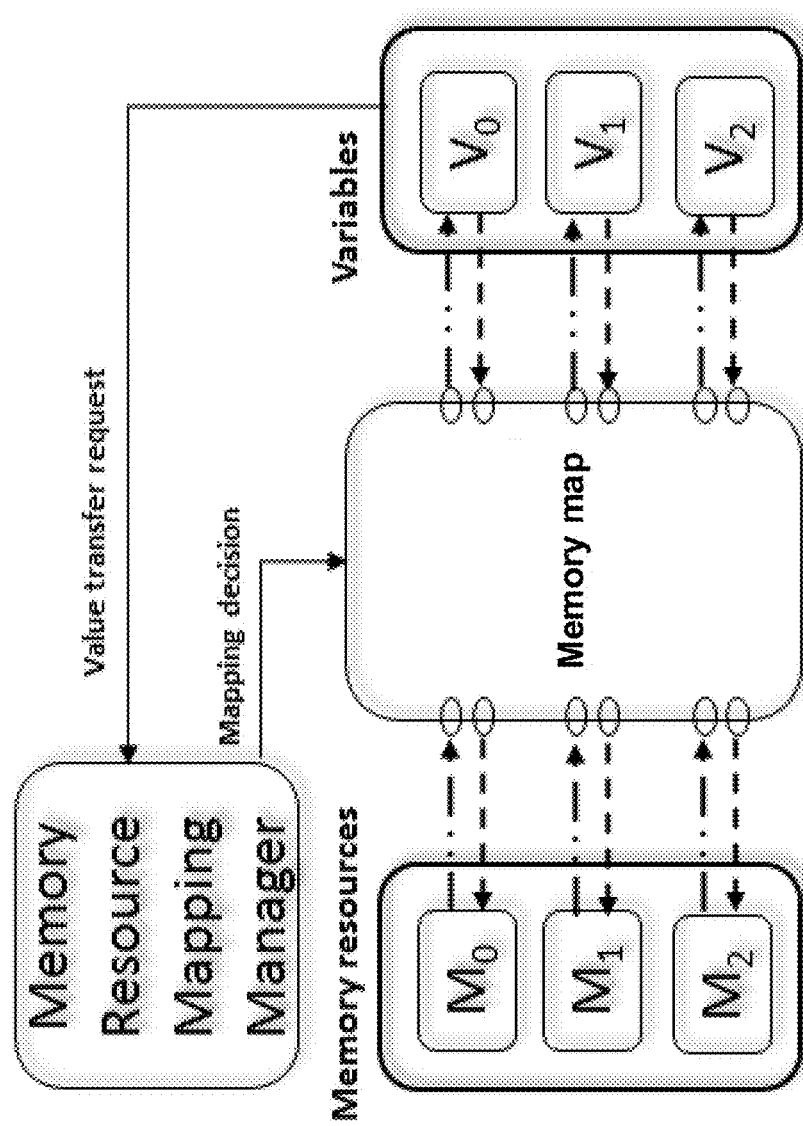
FIG. 7 illustrates an exemplary hardware architecture implementing dynamic memory resource mapping, according to one embodiment.

FIG. 7 illustrates an exemplary hardware architecture implementing dynamic memory resource mapping, according to one embodiment. As FIG. 7 shows, the exemplary architecture includes an embodiment of the above-mentioned memory resource mapping manager, communicatively coupled to a memory map (for mapping variables to memory resources), which in this exemplary embodiment is configured to receive a value transfer request, e.g., regarding variables $V_0$, $V_1$, and $V_2$, and provide a mapping decision regarding the memory map, specifically regarding the mapping between the variables $V_0$, $V_1$, and $V_2$, and memory resources $M_0$, $M_1$, and $M_2$.

Figure 8A:
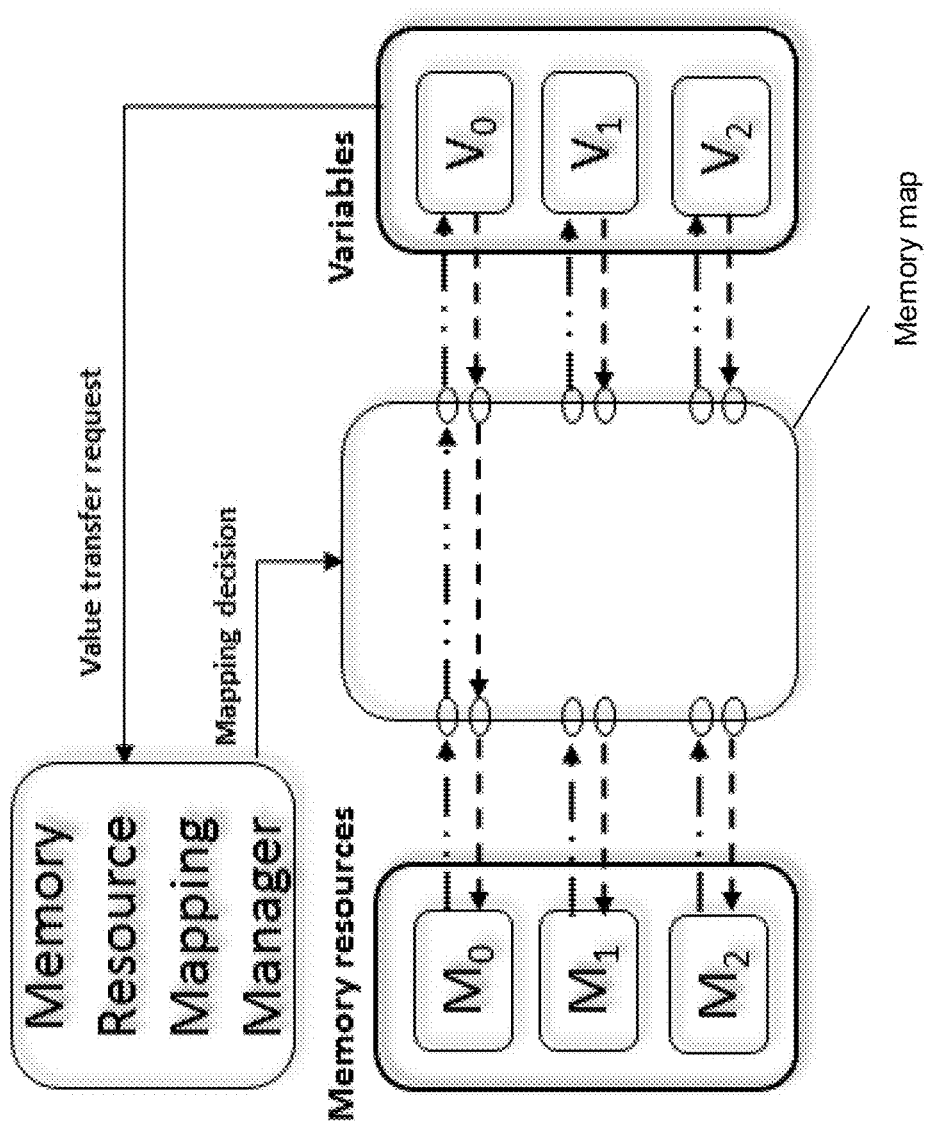
FIG. 8A illustrates the exemplary hardware architecture of FIG. 7 before transferring a value from variable $V_0$ to variable $V_0$, according to one embodiment.

FIG. 8A illustrates the exemplary hardware architecture of FIG. 7 before transferring a value from variable V0 to variable V0, according to one embodiment. In this exemplary embodiment, the memory map is configured to map variable $V_0$ to memory resource $M_0$. In other words, the value of variable $V_0$ is stored in memory resource $M_0$.

Figure 8B:
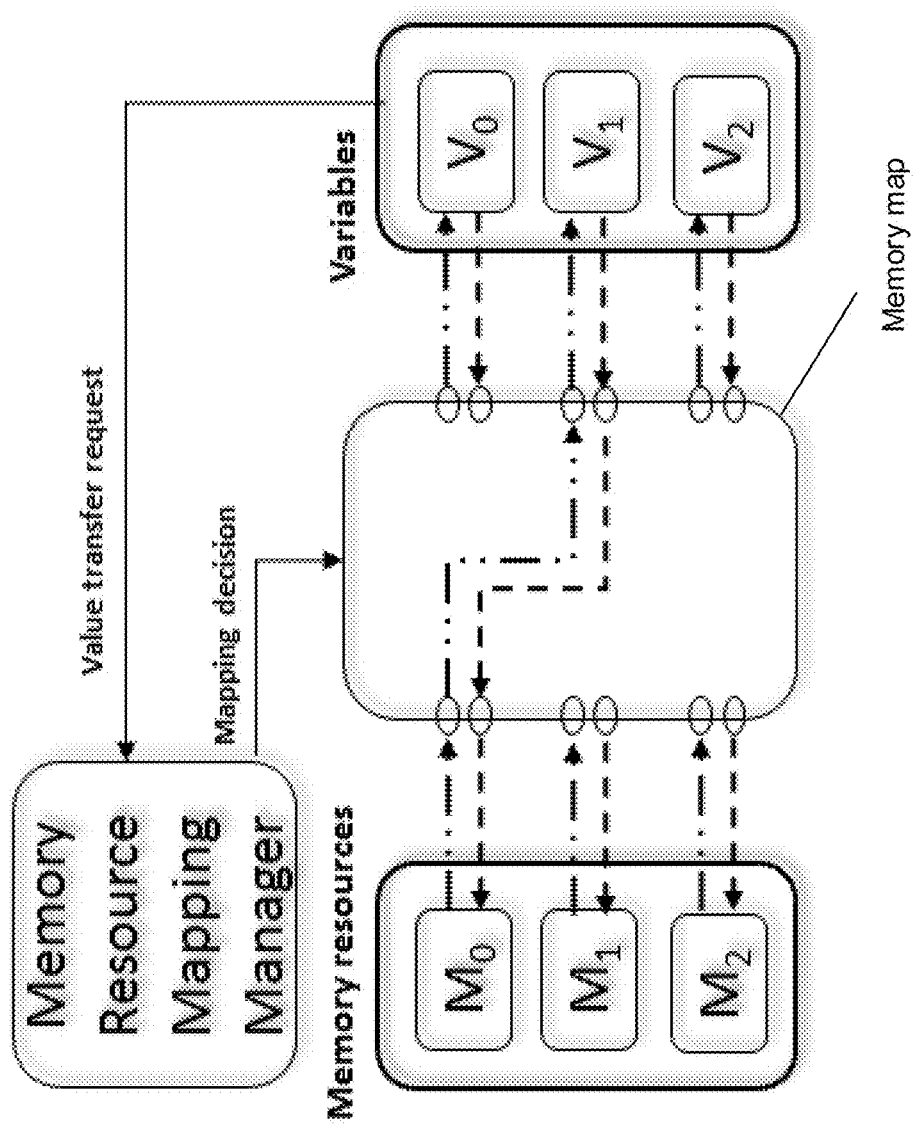
FIG. 8B illustrates the exemplary hardware architecture of FIG. 7 after transferring a value from variable $V_0$ to variable $V_0$, according to one embodiment.

FIG. 8B illustrates the exemplary hardware architecture of FIG. 7 after transferring a value from variable $V_0$ to variable $V_1$, per the techniques disclosed herein, according to one embodiment. As indicated, a value transfer from variable $V_0$ to variable $V_1$ was specified, and was achieved via a mapping decision from the memory resource mapping manager that dynamically changed the above mapping between the variables and the memory resources such that variable $V_1$ is mapped to memory resource $M_0$. Thus, per this new mapping, references (in the implementation of the program) to variable $V_1$ may be replaced with a memory resource lookup operation regarding memory resource $M_0$, thereby being configured to retrieve the value for variable $V_1$ from memory resource $M_0$, which holds the value previously associated with variable $V_1$. In this manner, the value of $V_0$ has been transferred to variable $V_1$ without copying the value between them.

In some embodiments, the method of FIG. 5 may further include deploying the implementation of the program to a hardware device. The deployed implementation may be executable on the hardware device to assign, e.g., by the implementation of the memory resource mapping manager, the respective specified memory resource to each of the one or more source variables and the destination variable. This assignment may include the above assigning a first memory resource to the destination variable and assigning one or more second memory resources to the one or more source variables, respectively. The deployed implementation may be further executable on the hardware device to execute, by the implementation of the memory resource mapping manager, the value transfer operation, which may include changing the mapping, where, as described above, changing the mapping may include assigning the memory resource of the first source variable of the one or more source variables to the destination variable, wherein said assigning the memory resource transfers the value of the first source variable to the destination variable without copying the value between the memory resources. In other words, when deployed, the implementation may operate as it was configured to do in method element 510.

In various embodiments, the memory resource mapping manager may be implemented in any of a variety of ways, including, but not limited to, one or more of: a finite state machine (FSM), one hot counter, a binary counter, a scoreboard, or a program executed on an embedded core, among others.

In some embodiments, compiling the program may further include analyzing effects of the dynamically changing the mapping on each value transfer operation with respect to performance improvement and/or resource cost. Based on this analysis, value transfer operations used in the dynamically changing the mapping that achieve a specified timing and/or resource constraint may be determined. Expressed another way, determining one or more value transfer operations in the program may be based on estimation of performance improvement and/or resource cost that is achievable by implementing said value transfer operations via said dynamically changing the mapping.

Figure 9A:
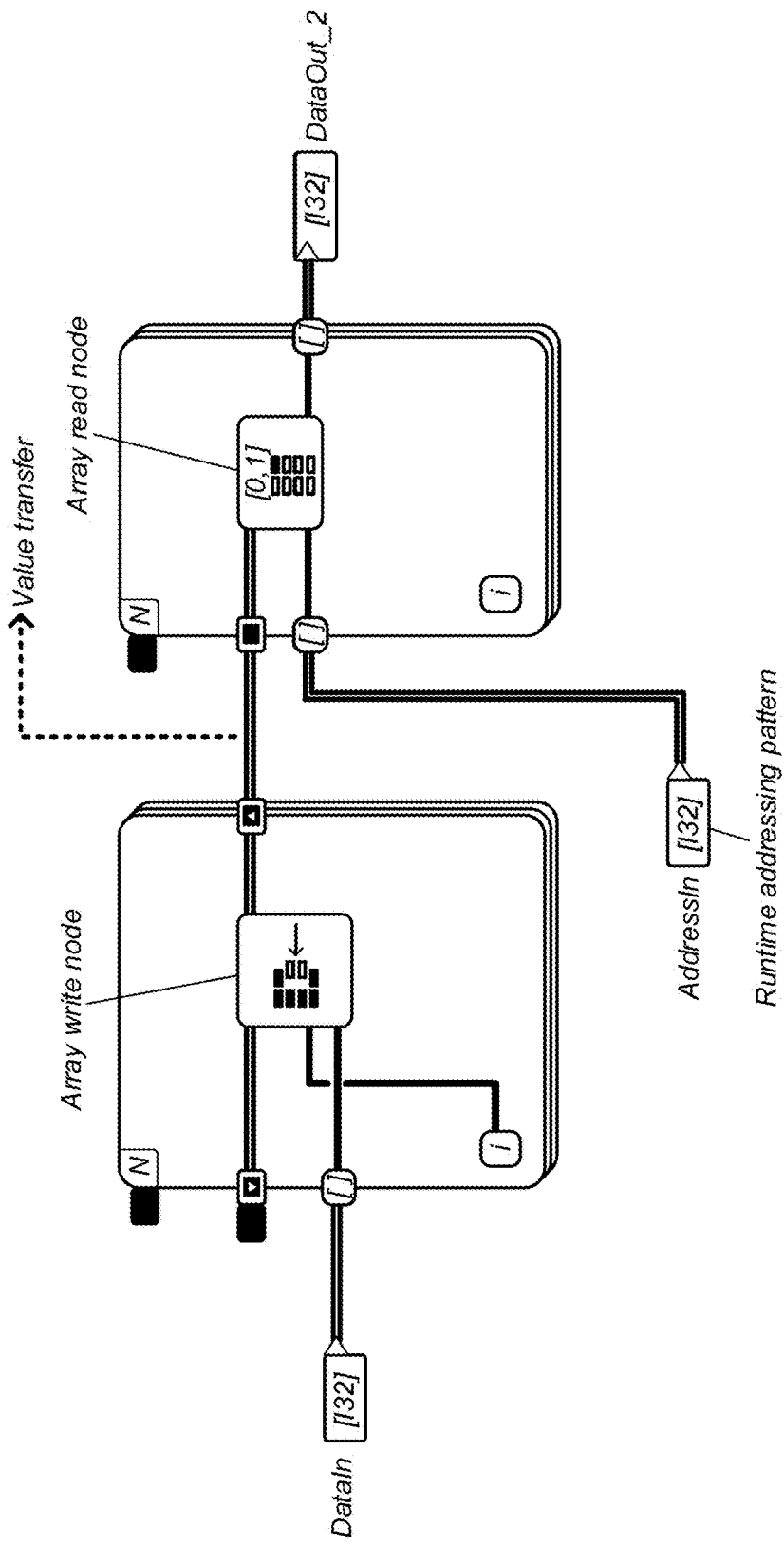
FIG. 9A illustrates an exemplary value transfer qualified for dynamic mapping, according to one embodiment.

FIG. 9A illustrates an exemplary value transfer qualified for dynamic mapping, according to one embodiment. In other words, the graphical program code of FIG. 9A, which includes first and second loops (on the left and right side of the figure, respectively) illustrates a value transfer operation that meets specified criteria regarding performance (improvement) or (memory resource) cost. The first (left) loop includes an array write node (e.g., "replace array subset" node) whereby input data ("DataIn") are inserted into an array, and which provides the resulting array as output. This array output is provided as input to an array read (or array indexing) node in the second (right) loop, along with an AddressIn value (runtime addressing pattern), and the array index node accesses or retrieves an element of the array, which is provided as output ("DataOut_2").

In this exemplary embodiment, a memory read in the second (right-hand) for-loop has an unknown addressing pattern (at compile time), and the first loop and the second loop cannot be executed in a pipelined manner. In other words, the addressing pattern is dynamic, and so not known at compilation. Thus, due to the unknown (at compile-time) memory access pattern, the compiler doesn't know how to optimize loop execution. However, if this value transfer operation between loops is implemented by a dynamic memory mapping (the above dynamically changing the mapping), the compiler is able to optimize the loop execution—the desired pipelined loop executions are allowed, which improves overall throughput performance. Thus, this exemplary value transfer qualifies for a dynamic variable/memory resource mapping.

Figure 9B:
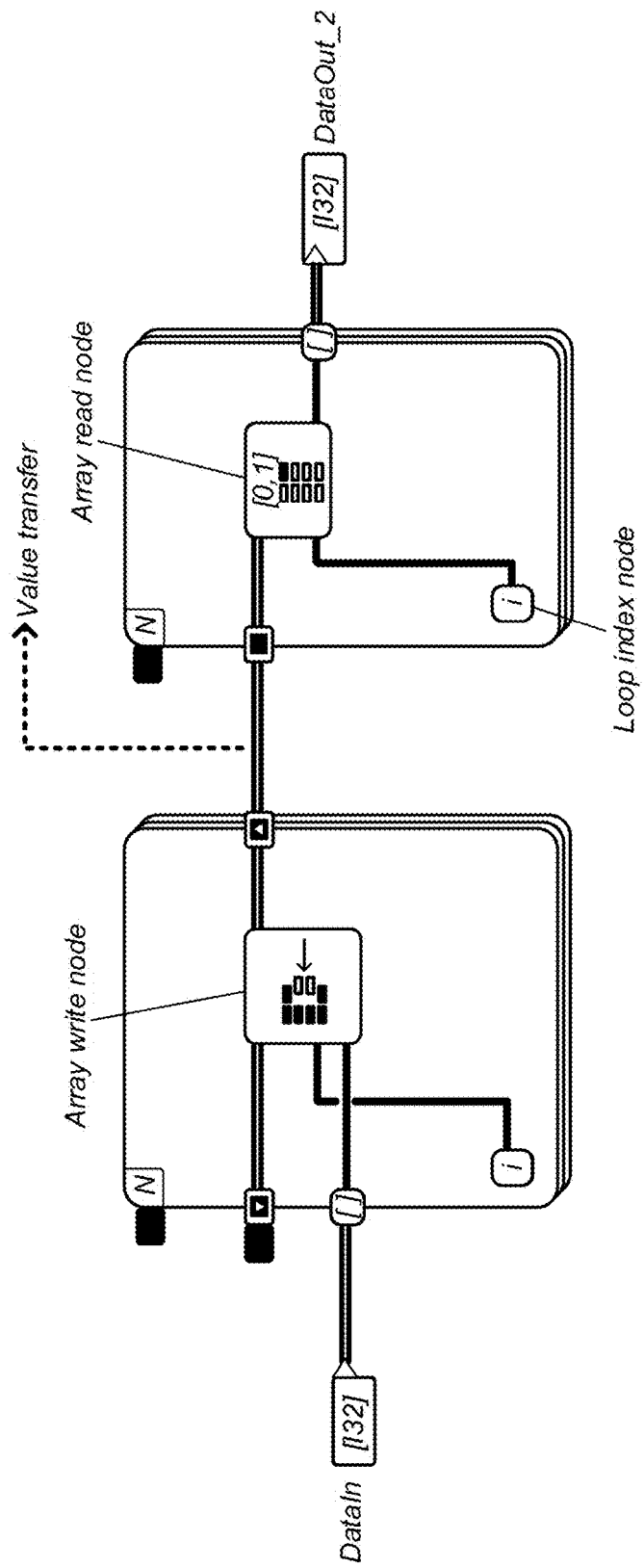
FIG. 9B illustrates an exemplary value transfer disqualified for dynamic mapping, according to one embodiment.

FIG. 9B illustrates an exemplary value transfer that is disqualified for dynamic mapping, according to one embodiment. As may be seen, the graphical program code of FIG. 9B, which also includes first and second loops (on the left and right side of the figure, respectively) illustrates a value transfer operation that fails to meet specified criteria regarding performance (improvement) or (memory resource) cost. As with the graphical program code of FIG. 9A, the left loop includes an array write node whereby input data ("DataIn") are inserted into an array, and which provides the resulting array as output to the second (right) loop. The array is then provided an array read node in the second (right) loop, along with a loop counter value (from a loop index node, so labeled), and the array read node accesses or retrieves an element of the array, which is provided as output ("DataOut").

In this particular example, both memory accesses in the loop structures have compile-time known addressing patterns. By taking an advantage of these access patterns, the compiler may be able to execute these loops in a pipelined manner, even without the benefit the dynamic variable mapping (the above dynamically changing the mapping). In other words, because the memory access pattern is known (for both array accesses), the compiler knows how to optimize loop execution even without use of the dynamic variable mapping technique disclosed herein. Thus, the dynamic memory mapping for this value transfer operation has very limited timing benefit, but increases memory resources, and thus, cost. For example, the dynamic mapping technique may utilize an extra FPGA resource, and so increases resource cost. Accordingly, from a timing-resource trade-offs perspective, this value transfer operation is disqualified with respect to a dynamic memory mapping.

General Creation of a Graphical Program

The following describes creation of graphical programs in general, according to some embodiments.

A graphical program may be created on the computer system 82 (or on a different computer system). The graphical program may be created or assembled by the user arranging on a display a plurality of nodes or icons and then interconnecting the nodes to create the graphical program. In response to the user assembling the graphical program, data structures may be created and stored which represent the graphical program. The nodes may be interconnected in one or more of a data flow, control flow, or execution flow format. The graphical program may thus comprise a plurality of interconnected nodes or icons which visually indicates the functionality of the program. As noted above, the graphical program may comprise a block diagram and may also include a user interface portion or front panel portion. Where the graphical program includes a user interface portion, the user may optionally assemble the user interface on the display. As one example, the user may use the LabVIEW™ graphical programming development environment to create the graphical program.

In an alternate embodiment, the graphical program may be created in 502 by the user creating or specifying a prototype, followed by automatic or programmatic creation of the graphical program from the prototype. This functionality is described in U.S. patent application Ser. No. 09/587,682 titled "System and Method for Automatically Generating a Graphical Program to Perform an Image Processing Algorithm", which is hereby incorporated by reference in its entirety as though fully and completely set forth herein. The graphical program may be created in other manners, either by the user or programmatically, as desired. The graphical program may implement a measurement function that is desired to be performed by the instrument.

In some embodiments, a graphical user interface or front panel for the graphical program may be created, e.g., in response to user input. The graphical user interface may be created in any of various ways, e.g., depending on the graphical programming development environment used.

It is noted that the graphical user interface and the block diagram may be created separately or together, in various orders, or in an interleaved manner. In one embodiment, the user interface elements in the graphical user interface or front panel may be specified or created, and terminals corresponding to the user interface elements may appear in the block diagram in response. For example, when the user places user interface elements in the graphical user interface or front panel, corresponding terminals may appear in the block diagram as nodes that may be connected to other nodes in the block diagram, e.g., to provide input to and/or display output from other nodes in the block diagram. In another embodiment, the user interface elements may be created in response to the block diagram. For example, the user may create the block diagram, wherein the block diagram includes terminal icons or nodes that indicate respective user interface elements. The graphical user interface or front panel may then be automatically (or manually) created based on the terminal icons or nodes in the block diagram. As another example, the graphical user interface elements may be comprised in the diagram.

The graphical program may be executed on any kind of computer system(s) or reconfigurable hardware, as described above.

Figure 10:
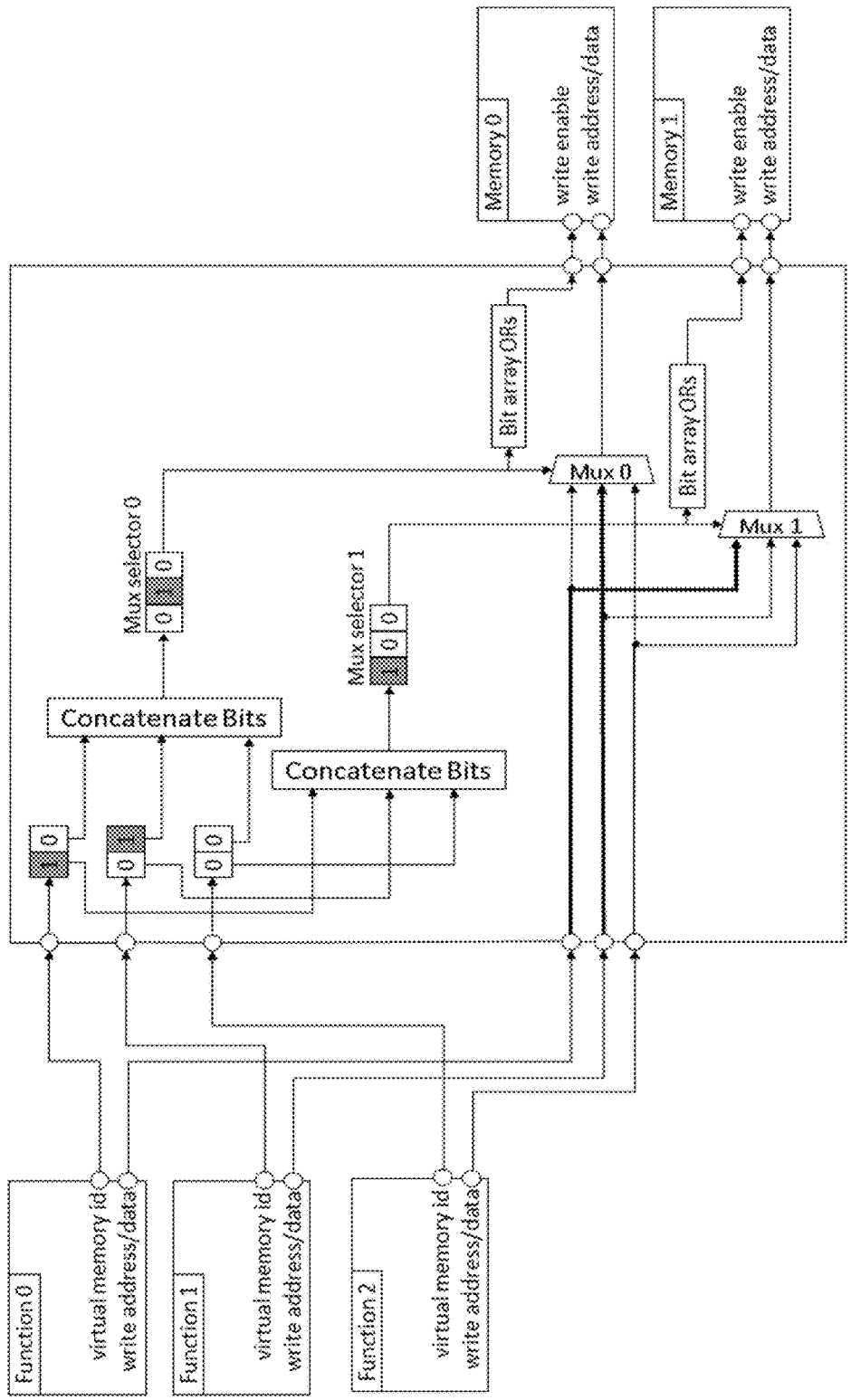
FIG. 10 is a schematic diagram of an exemplary hardware decoding circuit for decoding one-hot virtual memory id for memory write operations, according to some embodiments.
Figure 11:
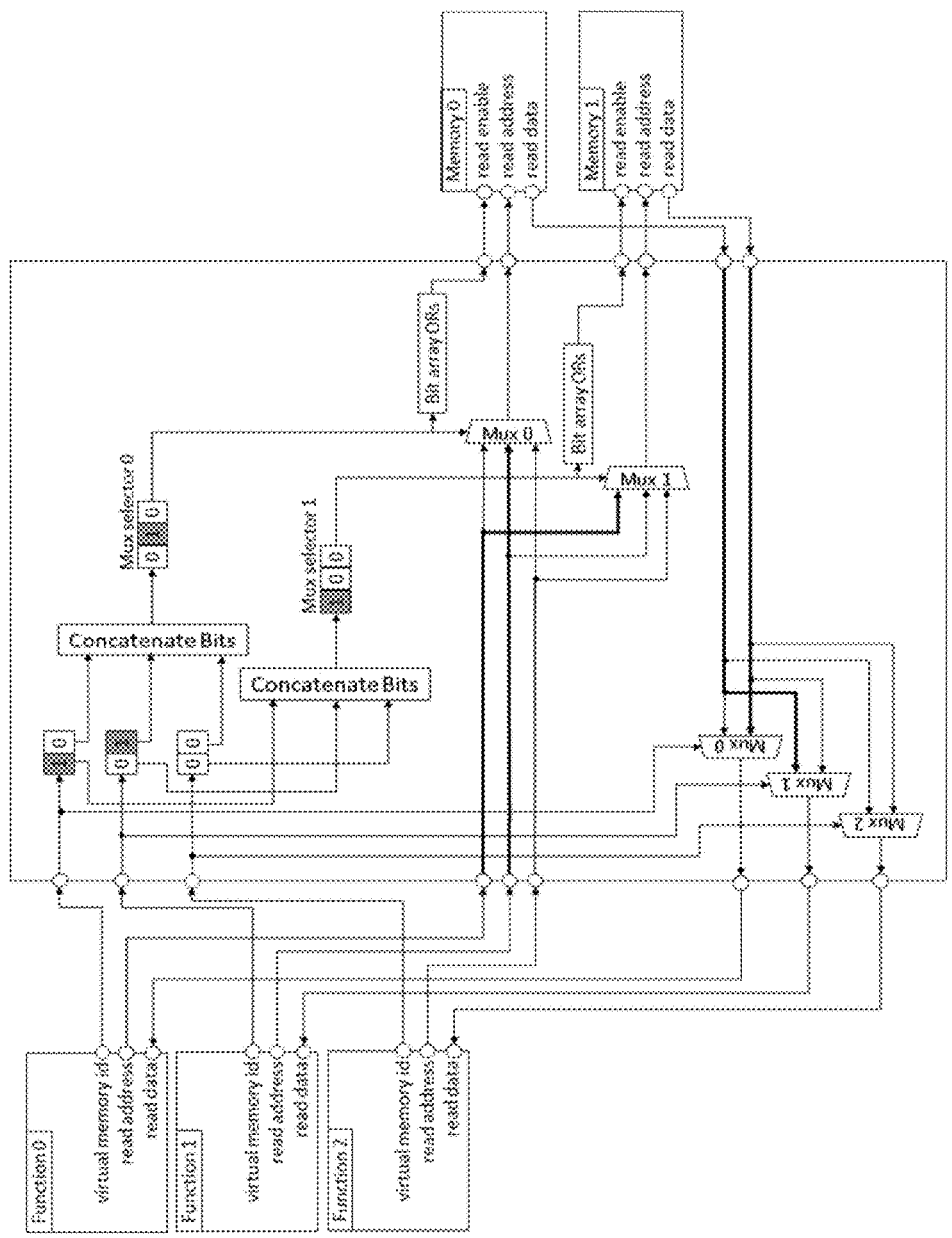
FIG. 11 is a schematic diagram of an exemplary hardware decoding circuit for decoding one-hot virtual memory id for memory read operations, according to some embodiments.

FIGS. 10 and 11—Dynamic Memory Write and Read Mapping

FIGS. 10 and 11 illustrate, respectively, an exemplary hardware decoding circuit for decoding a one-hot virtual memory id for memory write and read operations. One embodiment for memory resource mapping is to assign a one-hot value, the virtual memory id, to a memory reference variable. In some embodiments, each virtual memory id has at most a single bit having the value 1, with all other bits having the value 0. In these embodiments, if a virtual memory id has a value of 0 (ie, all bits have values 0), then this virtual memory id is a null reference, and read and writes to this memory reference are non-functional.

As illustrated in FIGS. 10 and 11, the virtual memory ids from one or more program structures may be used to enable and route addresses and data between read and write operations and actual memories using this decoding circuit. In one embodiment, this decoding logic consists of logic that concatenates each bit position of one or more virtual memory ids from the one or more memory references to form a one-hot select signal for each actual memory, which is then connected to:

Select input to one-hot-mux for selecting write addresses for each memory

Select input to one-hot-mux for selecting write data for each memory

Select input to one-hot-mux for selecting read addresses for each memory,

Select input to one-hot-mux for selecting read data for each memory

OR'ed together to form write-enable for each memory

OR'ed together to form read-enable for each memory

One embodiment for memory allocation is to make use of a "free memory" bit-vector and a "request memory reference" bit-vector. The free memory bit-vector may be composed of a single bit data representing memory availability, concatenated with one-hot value identifying a physical memory. The request memory reference bit-vector may be composed of a single bit data representing a memory request, concatenated with a one-hot value identifying the requesting memory reference. In these embodiments, the memory allocation task is then to combine the current set of free memory bit-vectors with the current set of request memory reference bit-vectors and generate a mapping between physical memory ids and memory references.

Figure 12:
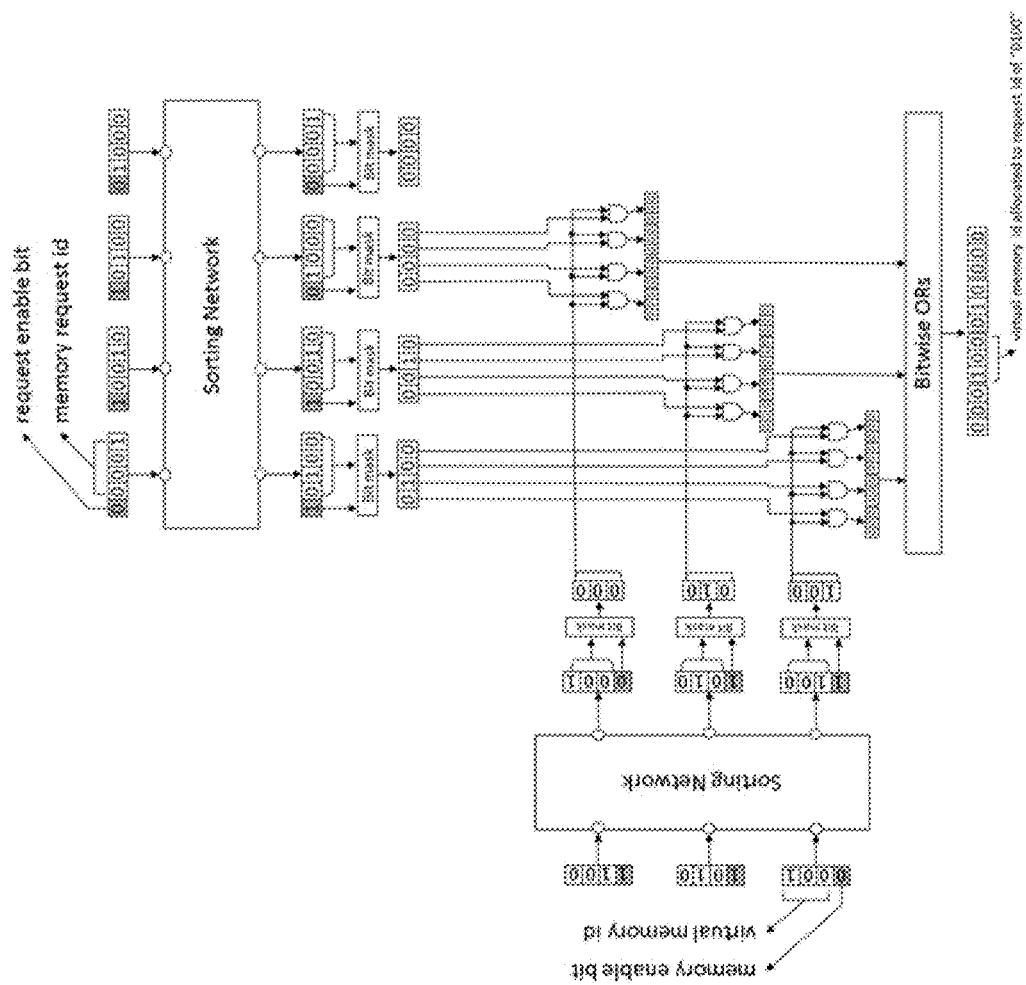
FIG. 12 is a schematic diagram of an exemplary hardware circuit implementing a memory allocation task in a single clock cycle, according to some embodiments.

FIG. 12—Memory Allocation Logic

FIG. 12 shows an exemplary hardware circuit implementing this memory allocation task in a single clock cycle, according to some embodiments. The sorting network may sort available memory virtual ids and request memory. Any number of sorting algorithm and implementation may be used, as desired. Please note that bit-vectors from a sorting network may be sorted in a descending order, such that bit-vectors with MSB value 1 are always before bit-vectors with MSB value 0. This sorted memory and request bit-vector may then be combined using the AND gate network shown in FIG. 12 to generate the memory allocation mapping.

Changing Pass-by-Value to Pass-by-Reference in a Program

Array wires going from one structure to a second structure in a graphical program (e.g., LabVIEW or another graphical program) may have "pass by value" semantics. If the value transfer is implemented strictly as pass-by-value, the execution of these structures may not be able to be pipelined. For example, the graphical program may have to wait until a first iteration is completed before a second iteration of a program structure may be initiated. In this case, a user may have to recode the program to manually incorporate pass-by-reference functionality and improve throughput. One example for recoding is for users to add a second array and insert ping-pong logic to dynamically switch between these two arrays. This is not easy for most users to do, and it is not easily scalable to many structures.

Embodiments described herein allow the compiler to, among other things, automatically implement ping-pong memory for the original, single array through multiple structures. This may achieve high throughput without requiring users to know about ping-pong memory or how to modify a program to use ping-pong memory. This automated approach is also scalable to many structures, without any user modification. Embodiments described herein are generally applicable techniques to optimizing compilers.

When compiling a program, one or more programming statements may be grouped into structures with defined boundaries, such as basic block (bounded by curly brackets or begin/end), loops, functions, or procedures, among other possibilities. Variables at the entry and exit points of these structures may need to pass their values into and out of these structures. These value transfer operations at the boundary of structures may get expensive in either execution time or storage space, or both.

For example, if an array of 10,000 elements are passed into a loop, then the compiler may copy this array variable into a second array variable of the same size (10,000 elements) on the entry of the loop. This copying of 10,000 elements may be expensive in both execution time and memory space, because it involves allocating a second 10,000 element array variable, and copying every element from the first array variable into the second array variable, so that the second array variable may be used inside the loop instead of the first array variable.

It some embodiments, performance may be improved if the compiler chooses to not copy the values of the entry/exit variables of a structure, but rather implements the value transfer operation of these entry/exit variables by updating the mapping of these variables to memory resources.

Said another way, in some embodiments, the compiler may choose to implement pass-by-value semantics for these boundary variables with pass-by-reference implementation, to improve program runtime or memory space, or both.

When implementing pass-by-value semantics with pass-by-reference implementation, care must be taken to ensure that conflicts are not introduced in the functionality of the program. For example, changing the mapping of variables to memory resources may inadvertently cause two variables to simultaneously attempt to access a single memory resource, causing a critical failure in the execution of the program. In some embodiments, and as explained in greater detail below, the lifetimes of these variables and their references may be analyzed with the help of graph analysis techniques, to ensure correctness of these transforms such that they do not disrupt the functionality of the program.

Figure 13:
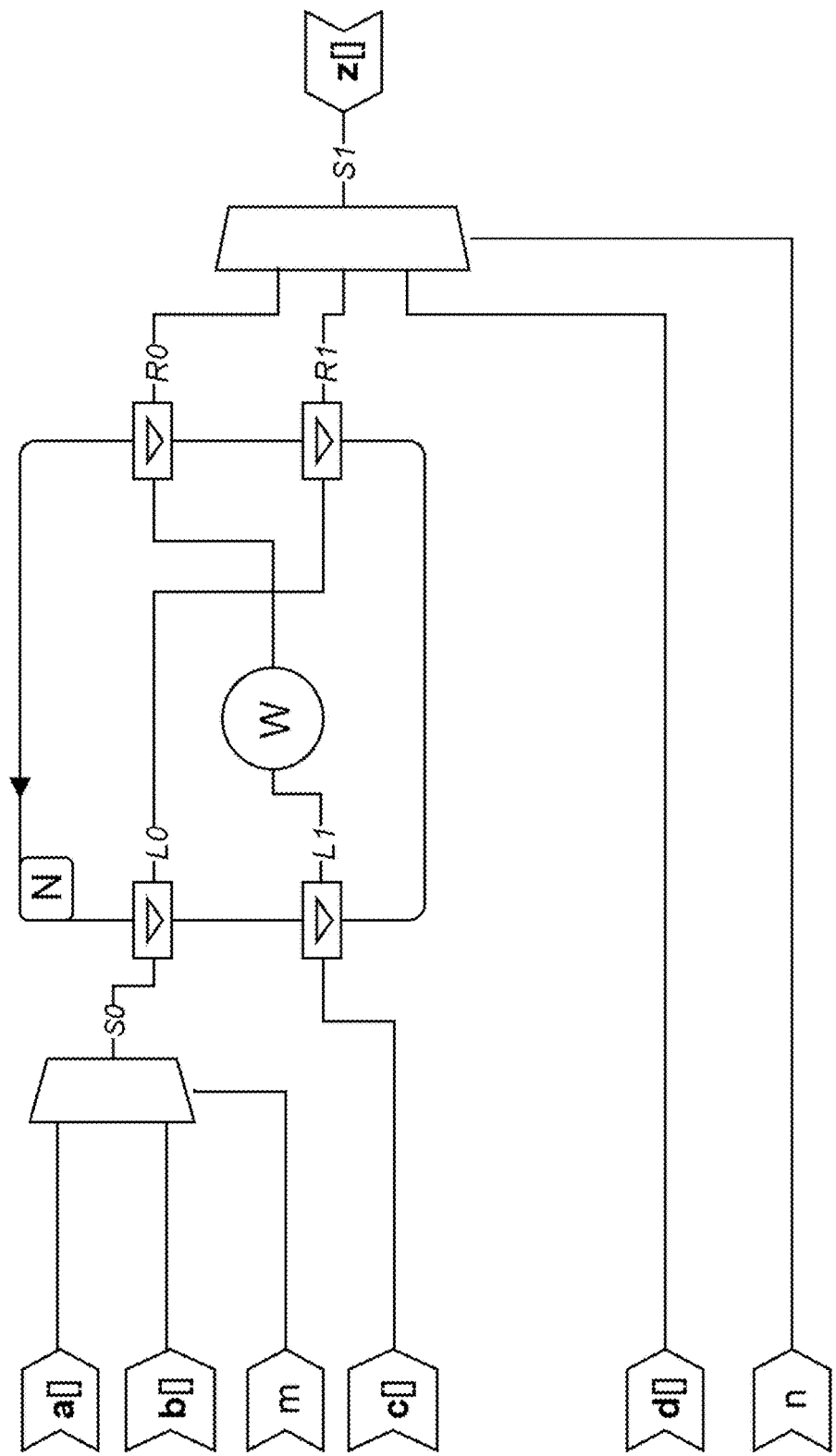
FIG. 13 is a schematic diagram of an exemplary program that may be compiled according to embodiments described herein.

FIG. 13—Schematic Diagram of a Program

FIG. 13 is a schematic diagram illustrating a program that may be compiled according to embodiments described herein. In the illustrated embodiment, the program takes the variables a, b, c, and d as inputs, with associated binary selectors m and n. As illustrated, the program further comprises intermediate program variables S0, L0, L1, R0, R1, and S1, and outputs the variable z. FIG. 13 is an example program, upon which the compiling steps detailed below may be implemented. Pseudocode for the program illustrated in FIG. 13 is as follows:

```
int[ ] doStuff(int[ ] a, int[ ] b, int[ ] c, int[ ] d)
{
    int[ ] S0 = m ? a : b;
    int[ ] L0 = S0;
    int[ ] L1 = c;
    for (int i = 0; i < N; i++)
    {
        L1[i] = getData( );
        int[ ] tmp = L1;
        L1 = L0;
        L0 = tmp;
    }
    int[ ] R0 = L0;
    int[ ] R1 = L1;
    int[ ] S1 = n == 0 ? R0 : n == 1 ? R1 : d;
    return S1;
}
```

The pseudocode above contains a plurality of program structures, which may be defined as, e.g., loops, sequence structures, conditional or switch/case structures, and so forth. In general, any section of code which receives input variables and/or produces output variables, which have their respective values assigned to intermediate functional variables, may be considered to be program structures. For example, in the pseudocode above, the assignment of either a or b to S0 depending on the value of the binary selector m may be considered a program structure.

Figure 14:
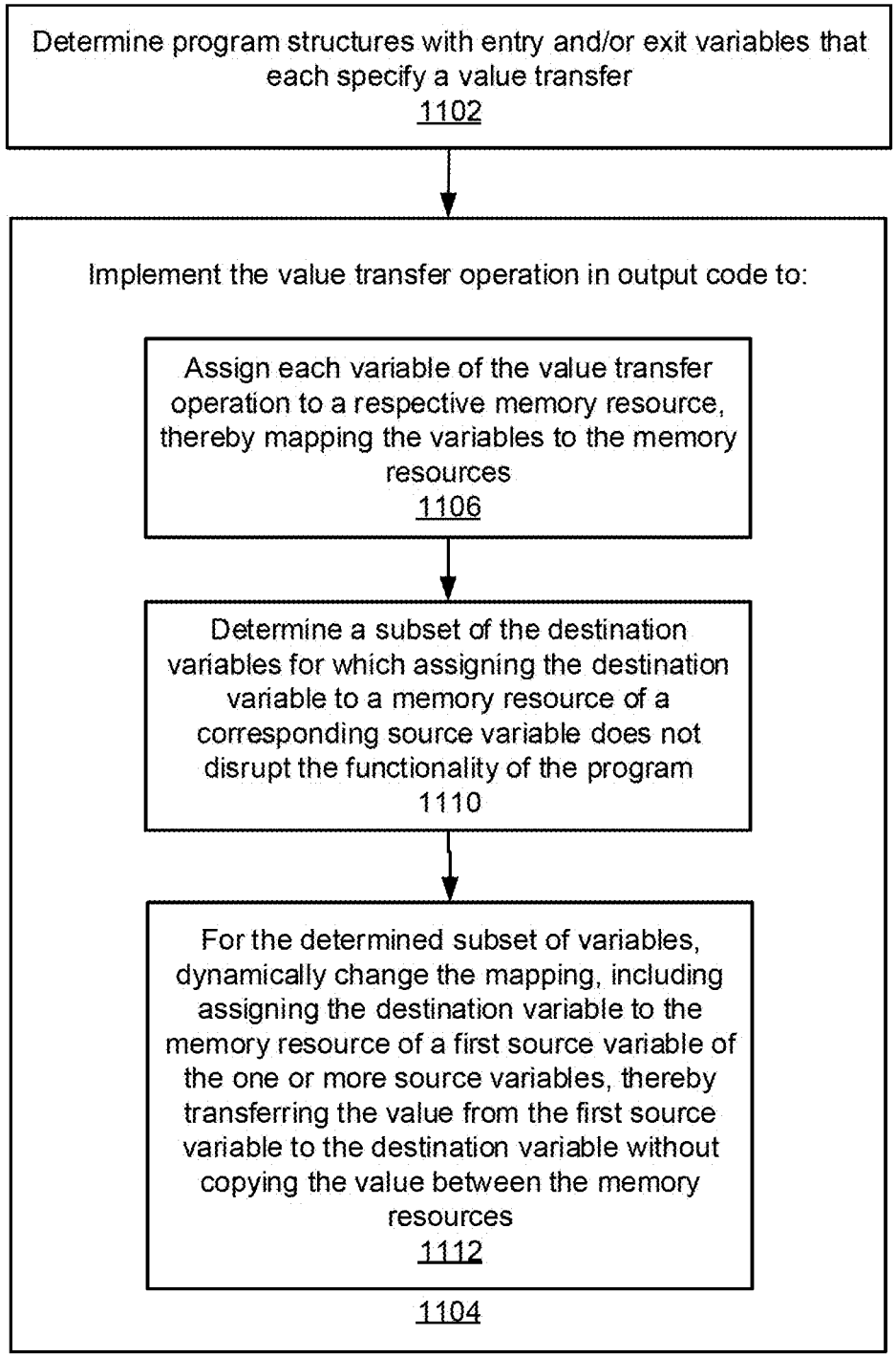
FIG. 14 is a flowchart diagram illustrating a method for performing value transfer operations in a program via dynamic memory resource mapping in a program, according to some embodiments.

FIG. 14—Flowchart for Performing Value Transfer Operations with Dynamic Memory Resource Mapping in a Program FIG. 14 is a flowchart diagram showing an exemplary method for performing value transfer operations with dynamic memory resource mapping in a program, according to some embodiments.

In some embodiments, at 1102, the compiler may determine and analyze each variable entering and exiting every program structure in the program, and may determine which of these variables to implement as pass-by-reference. For example, the compiler may determine a subset of variables that may be implemented as pass-by-reference without disrupting the functionality of the program. For example, if a compiler implemented multiple variables as pass-by-reference to a common memory resource, it is possible that during operation of the program, multiple variables may simultaneously attempt to access the common memory resource, leading to a critical failure of the program. As described in further detail below, embodiments described herein may prevent this type of failure, such that implementation of pass-by-reference for the determined subset of variables does not undesirably alter or disrupt the functionality of the program.

In some embodiments, at 1104, the compiler may generate output code which, during operations based on the output code, implements the determined subset of variables as pass-by-reference. In some embodiments, the output code may be configured for programming a programmable hardware device to perform operations that implement the functionality of the program according to the determined implementation. In other embodiments, the output code may be executed by a processor.

In some embodiments, at 1106, implementing the value transfer operation in output code may include assigning each variable of the value transfer operation to a respective memory resource, thereby mapping the variables to the memory resources.

In some embodiments, at 1110, the compiler may determine the subset of variables to implement as pass-by-reference by determining a memory resource requirement associated with the program. For example, the subset of variables may be selected such that, during operation of the output code, the memory used by the program does not exceed the determined memory resource requirement. For the determined subset of variables, the compiler may dynamically change the mapping of these variables to memory according to the steps discussed above with reference to FIG. 5.

In some embodiments, the compiler may determine that one or more program structures operate with a static schedule. For example, the compiler may analyze the program structures to determine an amount of time required for their computational completion, and it may determine whether the determined amount of time is static with regard to the input of the program structure. A program structure that operates according to a non-variable length of time may be considered to operate according to a static schedule. In response to determining that one or more of the program structures operate with a static schedule, the compiler may perform lifetime analysis on variables associated with these program structures. For example, for each entry variable, the compiler may define the lifetime of the variable as beginning at the start of the execution of its respective program structure. For each exit variable, the compiler may define the lifetime of the variable as ending at the end of the execution of its respective program structure. The compiler may collect all variables that have value transfers across program structures, and may analyze their lifetimes as a group of related variables.

The compiler may analyze lifetimes for related variables in the same group. In one embodiment, in a statically scheduled program, scheduled lifetimes for variables in all structures may be enumerated to look for overlapping lifetimes of variables in these structures. The maximum number of overlapping variables may determine the maximum number of memory resources that need to be allocated for this set of variables.

The lifetimes analyses enumerated above or other methods may be used to determine one or more of the following:

The lifetime analysis may determine whether memory allocation and free operations need to be inserted. For example, memory allocation may be inserted at the beginning of a variable's lifetime, and memory free may be inserted at the end of a variable's lifetime.

The lifetime analysis may further determine whether value copying operations are needed on entry or exit of structures. If needed, value copy operations may be inserted between the two variable references, in some embodiments. For example, if the lifetime analysis indicates that there will exist a lifetime overlap wherein two variables (e.g., a and b) will both be assigned the value of an input variable x, implementing both a and b as pass-by-reference may result in a critical memory failure, if both a and b simultaneously attempt to access the memory location of variable x. In this example, it may be necessary to implement at least one of a or b as pass-by-value, to prevent the potential for a critical memory failure.

The lifetime analysis may further determine whether program structures may be executed concurrently or in a pipelined manner. If it is determined that a program structure may be executed concurrently or in a pipelined manner, control flow dependencies between structures may be inserted or removed to improve run time speed, in some embodiments. For example, two or more program structures may be allowed to operate in a pipelined or parallel manner by passing values between the two or more program structures without copying values between their respective memory resources. Because the memory copy step for a large variable (such as an array) may be the computational bottleneck for a program, implementing pass-by-reference for the large variable may allow pipelining and improve throughput.

The lifetime analysis may further determine the maximum number of memory resources required to be allocated for use or reuse by these variables, so as to minimize or reduce memory usage.

In other embodiments, the compiler may determine that one or more of the program structures operate according to a dynamic schedule. For example, it may be determined that one or more program structures require a variable amount of time to complete depending on the input to the program structure (e.g., based on an asynchronous input that may arrive at different times, and/or based on different sizes of an input). For example, the graphical program illustrated in FIG. 13 may operate according to a dynamic schedule, because the binary selector m may variably select either of a or b to be assigned to S0. The variables a and b may comprise different sizes or may arrive at different times, which may change the lifetime of the associated program structures, thus leading to a dynamic schedule. In this case, a lifetime analysis may not adequately predict the memory resource requirements of the program, since the lifetimes of various program structures in the program may change. In response to determining that the program is a dynamically scheduled program, the compiler may construct a segment dependency graph based on the program structures in the program. The segment dependency graph may contain a node for each program structure, and each output that exits a given program structure and is input into another program structure. An example of a segment dependency graph is given in FIG. 15, which is based on the program schematic illustrated in FIG. 13. As illustrated in FIG. 13, S0 has dependencies on variables a and b, because S0 receives variables a and b as input. Similarly, S1 which receives as input R0, R1, and d, are thereby illustrated as dependent on R0, R1, and d.

Figure 15:
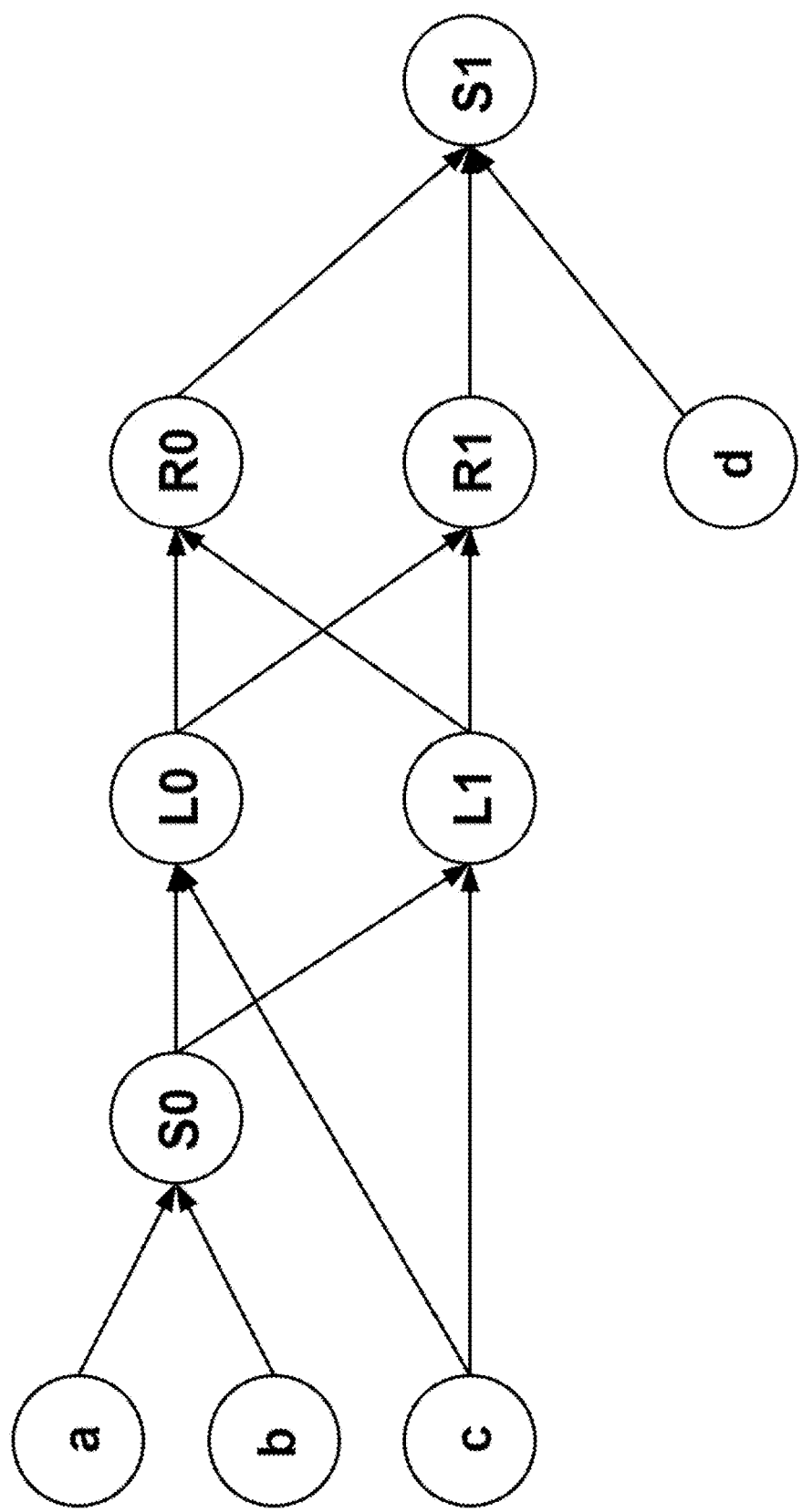
FIG. 15 is a segment dependency graph based on the program illustrated in FIG. 13, according to some embodiments.
Figure 16:
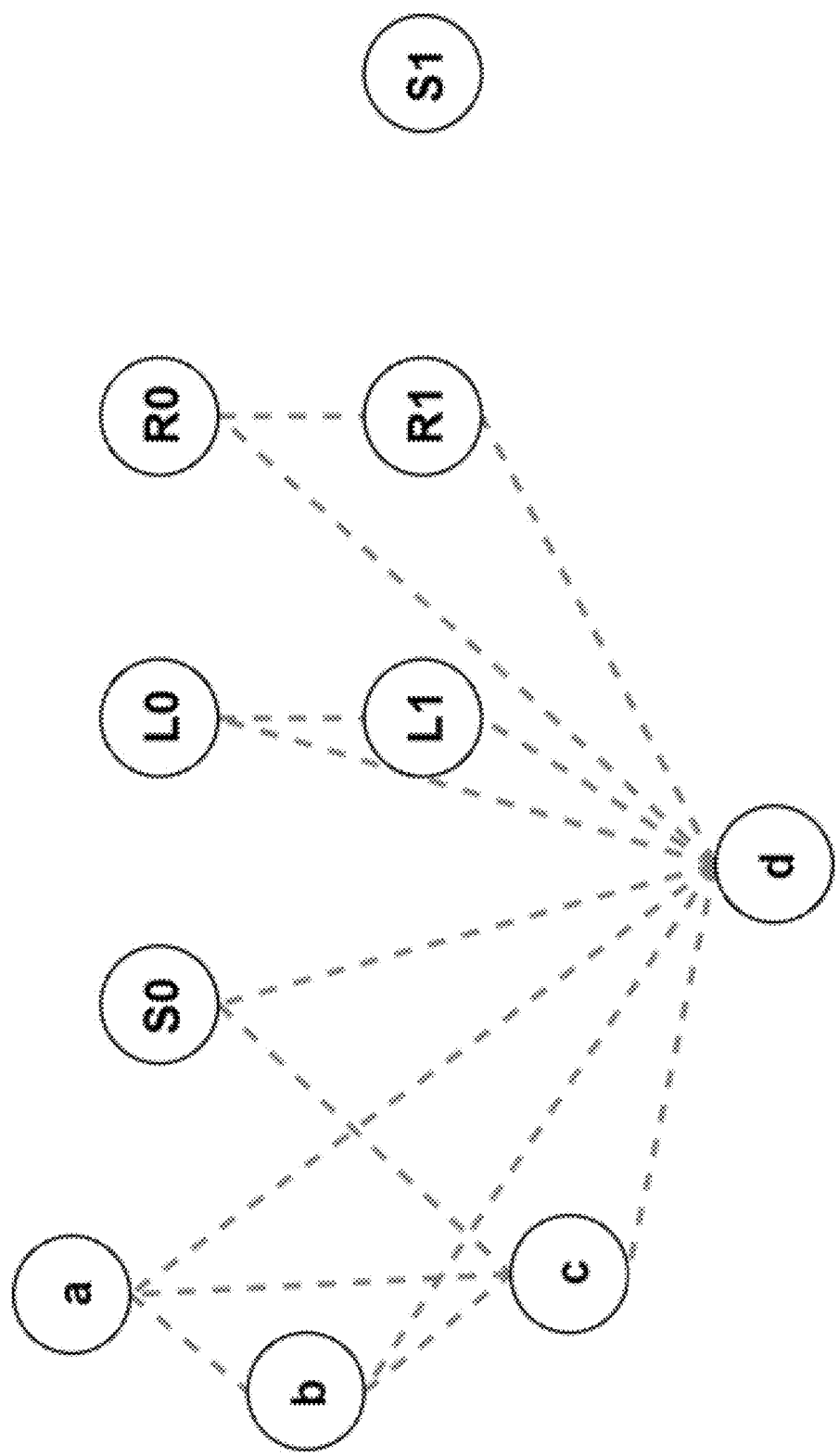
FIG. 16 is a segment conflict graph extracted from the segment dependency graph of FIG. 15, according to some embodiments.
Figure 17:
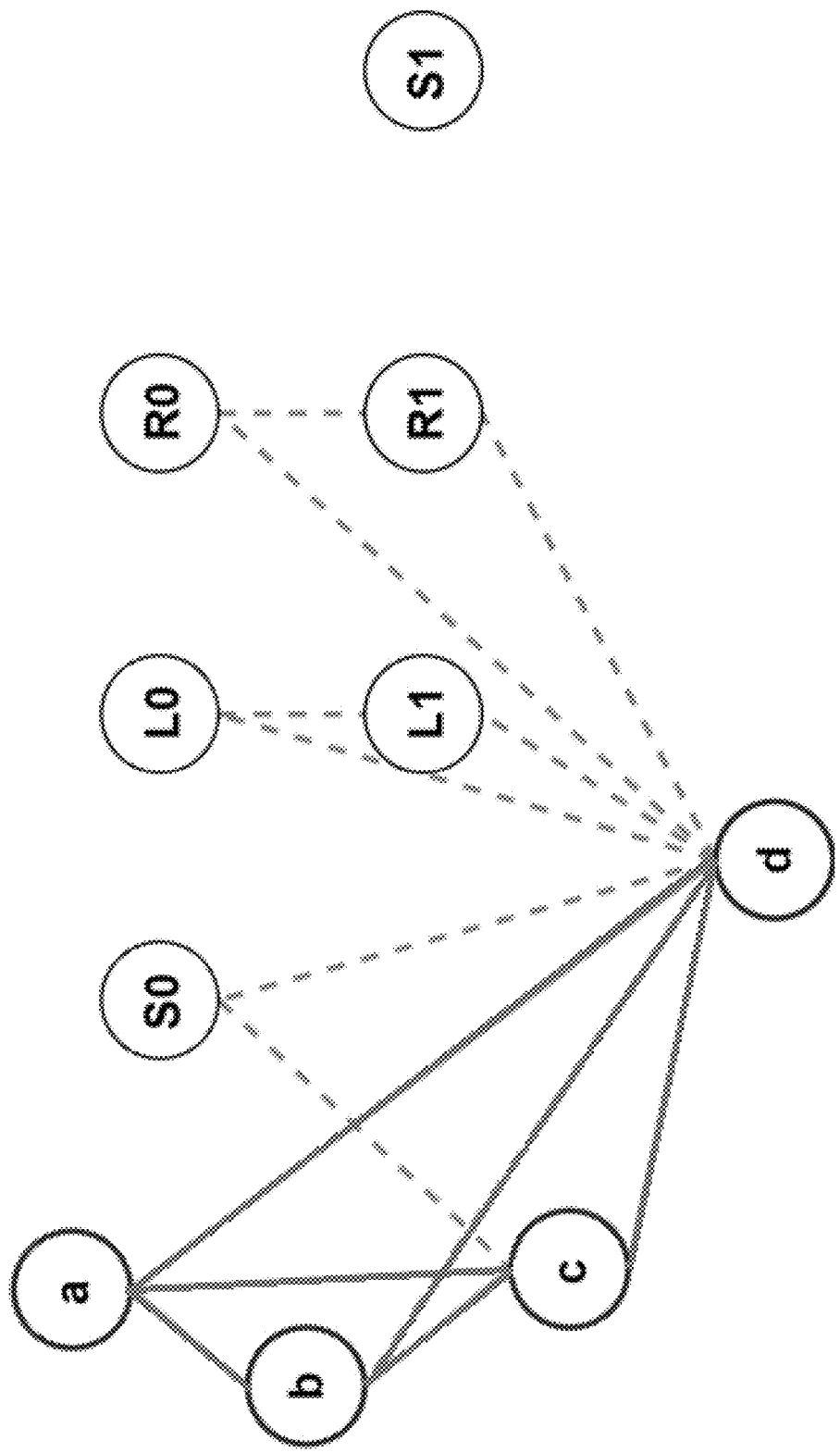
FIG. 17 illustrates the maximum clique size associated with the segment conflict graph in FIG. 16, according to some embodiments.

The compiler may then extract a conflict graph based on the segment dependency graph, wherein, in the conflict graph nodes are variables in structures, and edges are inserted between two nodes if and only if there are no data or control dependencies between variables represented by these two nodes. For example, in the graphical program illustrated in FIG. 13, a and b are independent inputs that have no mutual dependencies between them (i.e., altering a may not alter b). A conflict graph based on the segment dependency graph of FIG. 15 is illustrated in FIG. 16. The maximum clique in this conflict graph may determine the maximum number of memory resources that need to be allocated for this group of related variables. The maximum clique may be determined to be the maximum number of nodes in the conflict graph that are fully interconnected. For example, FIG. 17 illustrates a conflict graph with a maximum clique size of 4, since each of the variables a, b, c, and d are all fully interconnected with each other. For the program associated with the conflict graph in FIG. 17, it has been determined that no more than 4 memory resources will be required for simultaneous use. This determined memory resource requirement may then be used to determine how many of the variables in the program may be implemented as pass-by-reference.

In some embodiments, at 1112, the implementation of each value transfer operation may further include dynamically changing the mapping, including assigning the destination variable to the memory resource of a first source variable of the one or more source variables, thereby transferring the value from the first source variable to the destination variable without copying the value between the memory resources. Thus, the computational expense of copying the value may be avoided. Thus, embodiments of the method of FIG. 14 may shorten the time to execute variable assignments in a program, by (1) analyzing and finding specific variable assignments in a program, and (2) implementing the variable assignments by dynamically changing the mapping of variables to memory resources instead of copying values from one memory to another. Note that in various embodiments, a value may be singular or plural, e.g., may be a single value, or a collection of values, such as an array of values or values in any other plural data structure.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. An apparatus, comprising:
   a processor; and
   a non-transitory computer accessible memory medium coupled to the processor that stores program instructions executable by the apparatus to perform:
   compiling a program to generate output code, the compiling comprising:
   determining one or more program structures in the program containing one or more variables at the entry or exit of each of these program structures, wherein each variable at the entry or exit of a program structure specifies a value transfer between outside of a program structure and inside the program structure, and wherein each value transfer specifies a value transfer from one or more source variables to a destination variable; and implementing each of the value transfer operations in the output code, wherein, during operation based on the output code, the implementation of the value transfer operation includes:

assigning each variable of the value transfer operation to a respective memory resource, thereby mapping the variables to the memory resources;

determining a subset of the destination variables for which assigning the destination variable to a memory resource of a corresponding source variable does not disrupt the functionality of the program; and for the subset of the destination variables, dynamically changing the mapping, including assigning the destination variable to the memory resource of a first source variable of the one or more source variables, thereby transferring the value from the first source variable to the destination variable without copying the value between the memory resources.

2. The apparatus of claim 1,
wherein said determining the subset of the destination variables comprises determining a memory resource requirement associated with the program.

3. The apparatus of claim 2, wherein said compiling the program further comprises:
determining that the one or more program structures operate with a static schedule; and
in response to determining that the one or more program structures operate with a static schedule, collecting variables that transfer values across program structures into a group of related variables and analyzing the lifetimes of the related variables in the group of related variables.

4. The apparatus of claim 3, wherein said compiling the program further comprises:
determining temporal overlap of the lifetimes of the related variables in the group of related variables; and
wherein said determining the subset of the destination variables is based on the determined temporal overlap of the lifetimes.

5. The apparatus of claim 2, wherein said compiling the program further comprises:
determining that the one or more program structures operate with a dynamic schedule;
in response to determining that the one or more program structures operate with a dynamic schedule:
construct a segment dependency graph based on the one or more structures;
extract a segment conflict graph based on the segment dependency graph; and
determine the memory resource requirement associated with the program based on a maximum clique size of the segment conflict graph.

6. The apparatus of claim 1, wherein the output code is configured for operation by a programmable hardware device.

7. A non-transitory computer accessible memory medium that stores program instructions executable by a functional unit to perform operations comprising:
compiling a program to generate output code, the compiling comprising:
determining one or more program structures in the program containing one or more variables at one or more of the entry and exit of each of these program structures, wherein each variable specifies a value transfer between outside of a program structure and inside the program structure, and wherein each value transfer specifies a value transfer from one or more source variables to a destination variable; and implementing each of the value transfer operations in the output code, wherein, during operation based on the output code, the implementation of the value transfer operation includes:

assigning each variable of the value transfer operation to a respective memory resource, thereby mapping the variables to the memory resources;

determining a subset of the destination variables for which assigning the destination variable to a memory resource of a corresponding source variable does not disrupt the functionality of the program; and for the determined subset of the destination variables, dynamically changing the mapping, including assigning the destination variable to the memory resource of a first source variable of the one or more source variables, thereby transferring the value from the first source variable to the destination variable without copying the value between the memory resources.

8. The memory medium of claim 7,
wherein said determining the subset of the destination variables comprises determining a memory resource requirement associated with the program.

9. The memory medium of claim 8, wherein said compiling the program further comprises:
in response to determining that the one or more program structures operate with a dynamic schedule:
constructing a segment dependency graph based on the one or more program structures;
extracting a segment conflict graph based on the segment dependency graph; and
determining the memory resource requirement associated with the program based on a maximum clique size of the segment conflict graph.

10. The memory medium of claim 7, wherein said compiling the program further comprises:
determining that the one or more program structures operate with a static schedule; and
in response to determining that the one or more program structures operate with a static schedule, collecting variables that transfer values across program structures into a group of related variables and analyzing the lifetimes of the related variables in the group of related variables.

11. The memory medium of claim 10, wherein said compiling the program further comprises:
determining temporal overlap of the lifetimes of the related variables in the group of related variables; and
wherein said determining the subset of the destination variables is based on the determined temporal overlap of the lifetimes.

12. The memory medium of claim 7, wherein the output code is configured for programming a programmable hardware device to perform operations to implement the functionality of the program.

13. The memory medium of claim 7, wherein said compiling allows operation of two or more program structures in a pipelined manner by passing values between the two or more program structures without copying values between their respective memory resources.

14. A method for compiling a program to generate output code, the method comprising:

by a processor:

determining one or more program structures in the program containing one or more variables at the entry or exit of each of these program structures, wherein each variable at the entry or exit of a program structure specifies a value transfer between outside of a program structure and inside the program structure, and wherein each value transfer specifies a value transfer from one or more source variables to a destination variable;

implementing each of the value transfer operations in the output code, wherein, during operation based on the output code, the implementation of the value transfer operation includes:

assigning each variable of the value transfer operation to a respective memory resource, thereby mapping the variables to the memory resources;

determining a subset of the destination variables for which assigning the destination variable to a memory resource of a corresponding source variable does not disrupt the functionality of the program; and for the subset of the destination variables, dynamically changing the mapping, including assigning the destination variable to the memory resource of a first source variable of the one or more source variables, thereby transferring the value from the first source variable to the destination variable without copying the value between the memory resources.

15. The method of claim 14, wherein said determining the subset of the destination variables comprises determining a memory resource requirement associated with the program.

16. The method of claim 15, wherein said compiling the program further comprises:

determining that the one or more program structures operate with a static schedule; and in response to determining that the one or more program structures operate with a static schedule, collecting variables that transfer values across program structures into a group of related variables and analyzing the lifetimes of the related variables in the group of related variables.

17. The method of claim 16, wherein said compiling the program further comprises:

determining temporal overlap of the lifetimes of the related variables in the group of related variables; and wherein said determining the subset of the destination variables is based on the determined temporal overlap of the lifetimes.

18. The method of claim 15, wherein said compiling the program further comprises:

determining that the one or more program structures operate with a dynamic schedule;

in response to determining that the one or more program structures operate with a dynamic schedule:

construct a segment dependency graph based on the one or more structures;

extract a segment conflict graph based on the segment dependency graph; and determine the memory resource requirement associated with the program based on a maximum clique size of the segment conflict graph.

19. The method of claim 14, the method further comprising:

programming a programmable hardware device based on the output code such that the programmable hardware device is configured to operate to perform the functionality.

20. The method of claim 14, wherein said compiling allows operation of two or more program structures in a pipelined manner.

* * * * *